United States Patent
Cui et al.

(10) Patent No.: US 12,213,091 B2
(45) Date of Patent: Jan. 28, 2025

(54) REFERENCE CELL TIMING DETERMINATION

(71) Applicant: Apple Inc., Cupertino, CA (US)

(72) Inventors: Jie Cui, San Jose, CA (US); Qiming Li, Beijing (CN); Chunxuan Ye, San Diego, CA (US); Dawei Zhang, Saratoga, CA (US); Haitong Sun, Cupertino, CA (US); Hong He, San Jose, CA (US); Manasa Raghavan, Sunnyvale, CA (US); Seyed Ali Akbar Fakoorian, San Diego, CA (US); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 593 days.

(21) Appl. No.: 17/442,080

(22) PCT Filed: Mar. 31, 2021

(86) PCT No.: PCT/CN2021/084709
§ 371 (c)(1),
(2) Date: Sep. 22, 2021

(87) PCT Pub. No.: WO2022/205196
PCT Pub. Date: Oct. 6, 2022

(65) Prior Publication Data
US 2023/0232354 A1    Jul. 20, 2023

(51) Int. Cl.
*H04W 56/00*    (2009.01)
*H04W 76/28*    (2018.01)

(52) U.S. Cl.
CPC ....... *H04W 56/0045* (2013.01); *H04W 76/28* (2018.02)

(58) Field of Classification Search
CPC .......................... H04W 56/0045; H04W 76/28
See application file for complete search history.

(56) References Cited

U.S. PATENT DOCUMENTS

| | | | |
|---|---|---|---|
| 11,357,052 B2 * | 6/2022 | Siomina | H04L 5/00 |
| 2020/0137601 A1 * | 4/2020 | Siomina | H04W 4/70 |
| 2020/0162939 A1 * | 5/2020 | Kim | H04B 7/0617 |
| 2020/0267701 A1 | 8/2020 | Park et al. | |
| 2020/0389221 A1 * | 12/2020 | He | H04W 4/00 |

(Continued)

FOREIGN PATENT DOCUMENTS

| | | |
|---|---|---|
| CN | 111095846 | 5/2020 |
| CN | 111510262 | 8/2020 |
| WO | 2020146892 | 7/2020 |

OTHER PUBLICATIONS

Enhancements on Multi-beam Operation, Qualcomm Incorporated 3GPP TSG RAN WG1 Meeting #100-Bis-e R1-2002552, Apr. 30, 2020, 8 pages.

(Continued)

*Primary Examiner* — Christopher M Crutchfield
*Assistant Examiner* — Tito Q Pham
(74) *Attorney, Agent, or Firm* — Kilpatrick Townsend & Stockton LLP

(57) ABSTRACT

The present application relates to devices and components including apparatus, systems, and methods to determine availability of a reference cell for determining a timing of an uplink transmission in a user equipment transmission occasion.

18 Claims, 10 Drawing Sheets

(56) References Cited

U.S. PATENT DOCUMENTS

| | | | |
|---|---|---|---|
| 2021/0289443 A1* | 9/2021 | Nam | H04B 7/0695 |
| 2021/0314888 A1* | 10/2021 | Rahman | H04W 56/004 |
| 2021/0392582 A1* | 12/2021 | Chen | H04W 52/0219 |
| 2022/0007316 A1* | 1/2022 | Tang | H04L 5/0094 |
| 2022/0141842 A1* | 5/2022 | Kanamarlapudi | H04W 72/23 |
| | | | 370/329 |
| 2022/0377756 A1* | 11/2022 | Sun | H04L 5/005 |
| 2023/0032593 A1* | 2/2023 | Chen | H04W 56/001 |
| 2023/0043974 A1* | 2/2023 | Islam | H04L 5/0078 |
| 2023/0087417 A1* | 3/2023 | Wang | H04W 24/10 |
| | | | 370/252 |
| 2023/0224836 A1* | 7/2023 | Wu | H04W 72/04 |
| | | | 370/503 |
| 2024/0014979 A1* | 1/2024 | Lei | H04L 5/0092 |

OTHER PUBLICATIONS

Feature Lead Summary #1 on L1-SINR and SCell BFR, Moderator (Apple) 3GPP TSG RAN WG1 #100b R1-2002339, Apr. 30, 2020, 18 pages.

International Patent Application No. PCT/CN2021/084709, International Search Report and Written Opinion, Mailed on Dec. 30, 2021, 9 pages.

3rd Generation Partnership Project; Technical Specification Group Radio Access Network; NR; Requirements for support of radio resource management (Release 17), 3GPP TS 38.133 V17.0.0, Dec. 2020, 2400 pages.

\* cited by examiner

| DRX cycle | PHY measurement time interval |
|---|---|
| No DRX | $K_p \times$ SMTC period $\times$ CSSF$_{intra}$ |
| DRX cycle $\leq$ 320ms | $1.5 \times K_p \times$ max(SMTC period, DRX cycle) $\times$ CSSF$_{intra}$ |
| DRX cycle > 320ms | $K_p \times$ DRX cycle $\times$ CSSF$_{intra}$ |

Figure 1

| DRX cycle | PHY measurement time interval |
|---|---|
| No DRX | max(MGRP, SMTC period) $\times$ CSSF$_{intra}$ |
| DRX cycle $\leq$ 320ms | $1.5 \times$ max(MGRP, SMTC period, DRX cycle) $\times$ CSSF$_{intra}$ |
| DRX cycle > 320ms | (MGRP, DRX cycle) $\times$ CSSF$_{intra}$ |

Figure 2

REFERENCE CELL TIMING DETERMINATION

CROSS-REFERENCE TO RELATED APPLICATIONS

This application is a 371 United States National Phase of PCT International Patent Application No. PCT/CN2021/084709, filed on Mar. 31, 2021; the disclosure of which is incorporated by reference herein in its entirety for all purposes.

BACKGROUND

As wireless communication networks continue to develop and improve, additional challenges are presented. Fifth generation (5G) new radio (NR) has developed to make use of the unlicensed spectrum. Operating within the unlicensed spectrum provides additional challenges that were not addressed by legacy networks. For example, challenges with timing and use of transmission resources within the unlicensed spectrum were not addressed by legacy networks.

BRIEF DESCRIPTION OF THE DRAWINGS

FIG. 1 illustrates a table providing example physical layer measurement time intervals based on discontinuous reception cycle for intra-frequency measurement on a reference cell without measurement gap in accordance with some embodiments.

FIG. 2 illustrates a table providing example physical layer measurement time intervals based on discontinuous reception cycle for intra-frequency measurement on a reference cell with measurement gap in accordance with some embodiments.

DETAILED DESCRIPTION

Figure 3:
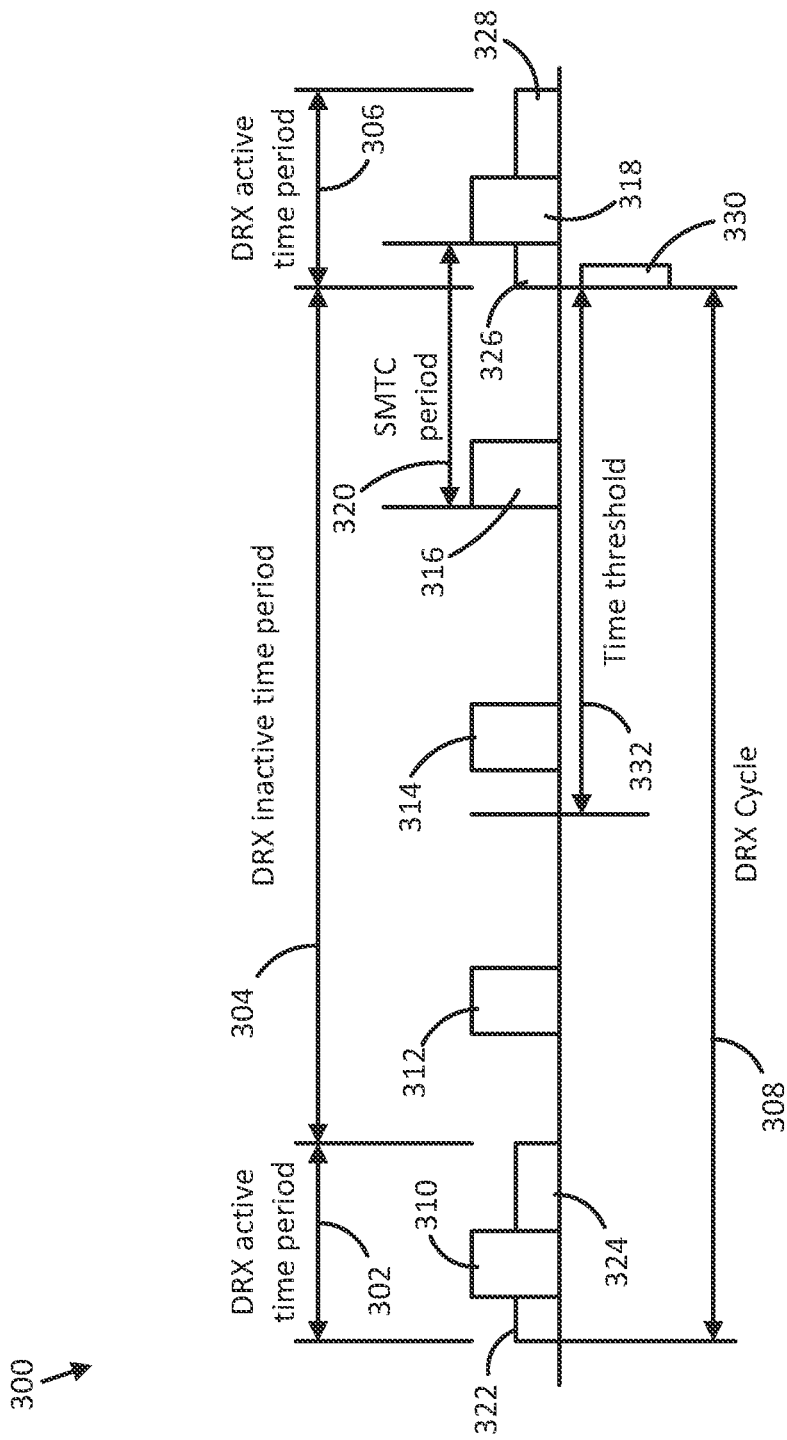
FIG. 3 illustrates an example discontinuous reception transmission arrangement to illustrate some concepts of the first approach in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

This disclosure can relate to user equipment (UE) behavior enhancement to maintain new radio unlicensed (NR-U) reference cell in discontinuous reception (DRX). For example, approaches disclosed herein may be utilized for determining timing advance based on a NR-U reference cell in DRX operation of a UE.

In legacy radio access network working group 4 (RAN4) technical specification (TS) 38.133 (3GPP Organizational Partners. (2020-12). 3rd Generation Partnership Project; Technical Specification Group Radio Access Network: NR; Requirements for support of radio resource management (Release 17) (3GPP TS 38.133 V 17.0.0)) (referred to as "TS 38.133" throughout this disclosure), the reference cell availability was defined as below with regards to the UE transmit timing, and that's the criteria for a UE to determine if the reference timing of current reference cell is reliable or not. If it's not reliable there also is the definition in TS 38.133 section 7.1.2.

UE Transmit Timing

Introduction

The UE shall have capability to follow the frame timing change of the reference cell in connected state. The uplink frame transmission takes place $(N_{TA}+N_{TA\ offset}) \times T_c$ before the reception of the first detected path (in time) of the corresponding downlink frame from the reference cell. For serving cell(s) in primary timing advance group (pTAG), UE shall use the special cell (SpCell) as the reference cell for deriving the UE transmit timing for cells in the pTAG. For serving cell(s) in secondary timing advance group (sTAG), UE shall use any of the activated secondary cells (SCells) as the reference cell for deriving the UE transmit timing for the cells in the sTAG. UE initial transmit timing accuracy and gradual timing adjustment requirements are defined in the following requirements.

In the requirements of section 7.1.2 of TS 38.133, the term reference cell on a carrier frequency subject to clear channel assessment (CCA) is not available at the UE refers to when at least one SSB is configured by next generation nodeB (gNB), but the first two successive candidate SSB positions for the same SSB index within the discovery burst transmission window are not available at the UE due to downlink (DL) CCA failures at gNB during the last 160 milliseconds (ms); otherwise the reference cell on the carrier frequency subject to CCA is considered as available at the UE.

However, the current criteria (described above in relation to the UE transmit timing) is problematic if the synchronization signal/physical broadcast channel block (SSB) is checked only in the recent 160 ms. Some new scenarios and possibilities are to be further considered and therefore are some new approaches and scenarios described throughout this disclosure.

Three options were previously discussed to address the issue. Option 1: SSB does not have to be within ON duration in a reference cell subject to DL CCA in order to meet UE timing requirements No clarification related to DRX is needed on the current definition of unavailability of a reference cell on a carrier frequency subject to CCA in section 7.1.1 of TS 38.133.

Option 2: Clarification in TS 38.133: In the requirements of section 7.1.2 of TS 38.133, the term reference cell on a carrier frequency subject to CCA is not available at the UE refers to when at least one SSB is configured by next generation nodeB (gNB), but the first two successive candidate SSB positions for the same SSB index within the discovery burst transmission window are not available at the UE during the last 160 ms; otherwise the reference cell on the carrier frequency subject to CCA is considered as available at the UE. The UE considers only SSB in the gap (if configured) and during DRX ON duration (if configured) as available.

Option 3: In case of DRX in use, the availability of the reference cell is based on the DRX cycles with at least one SSB-based measurement timing configuration (SMTC)/discovery reference signal (DRS) window where there are no SSBs available during the last 160 ms. Clarification in TS 38.133: In case of DRX in use, the reference cell can be considered as not available if at least one discovery burst transmission window within a DRX cycle where at least one SSB is configured by gNB, but the first two successive candidate SSB positions for the same SSB index within the discovery burst transmission window are not available at the UE due to DL CCA failures at gNB during the last 160 ms.

A fourth option may also be considered. Option 4: In the requirements of section 7.1.2 of TS 38.133, the term reference cell on a carrier frequency subject to CCA is not available at the UE may refer to when at least one SSB is configured by gNB, but the first two successive candidate SSB positions for the same SSB index within the discovery burst transmission window may not be available at the UE due to DL CCA failures at gNB during the last max {physical layer (PHY) measurement time interval of reference cell, 160 ms}; otherwise the reference cell on the carrier frequency subject to CCA is considered as available at the UE.

When UE performs intra-frequency measurement on reference cell without measurement gap (MG), PHY measurement time interval of reference cell may be as illustrated in FIG. 1. For example, FIG. 1 illustrates a table 100 providing example PHY measurement time intervals based on DRX cycle for intra-frequency measurement on a reference cell without MG in accordance with some embodiments. The table 100 includes DRX cycles 102 and PHY measurement time intervals 104 for each DRX cycle. As can be seen the PHY measurement time interval for each DRX cycle may be defined based on a parameter $K_p$, an SMTC period, a cell-specific scaling factor ($CSSF_{intra}$), a length of a DRX cycle (DRX cycle), or some combination thereof.

When UE performs intra-frequency measurement on reference cell with MG, PHY measurement time interval of reference cell may be as illustrated in FIG. 2. For example, FIG. 2 illustrates a table 200 providing example PHY measurement time intervals based on DRX cycle for intra-frequency measurement on a reference cell with MG in accordance with some embodiments. The table 200 includes DRX cycles 202 and PHY measurement time intervals 204 for each DRX cycle. As can be seen the PHY measurement time interval for each DRX cycle may be defined based on an SMTC period, a cell-specific scaling factor ($CSSF_{intra}$), a length of a DRX cycle (DRX cycle), a measurement gap repetition period (MGRP), or some combination thereof.

Beside the options discussed above, additional approaches and scenarios may be considered. DRX case may be treated differently for SSB based approach. If DRX is used, the UE behavior for timing tracking might be different inside and outside of the DRX active time, but in the legacy approaches the SSB outside DRX active time is not considered.

Timing reference signal (TRS) approach may be treated differently. Besides SSB based timing tracking, the TRS based approach may also be one option. TRS may not need to share the measurement resource, so carrier-specific scaling factor (CSSF) for measurement scaling may not be needed in this case.

Aperiodic (AP) channel state information reference signal (CSI-RS) for timing tracking. In order to improve the efficiency, the advanced approach of aperiodic channel state information reference signal (AP-CSI-RS) based timing tracking could also be an option, at least in the future release.

A first approach for a DRX mode of a UE may be applied to UEs configured in DRX mode. A UE configured in DRX mode may transition between DRX active time periods and DRX inactive time periods. In the DRX active time periods, the components of the UE may be maintained in an active state (which may also be referred to as an on state). In the DRX inactive time periods, at least a portion of the components of the UE may be maintained in an inactive state (which may be a sleep state or an off state). In some embodiments, the UE may monitor a physical downlink control channel (PDCCH) during the DRX active time periods, whereas the UE does not monitor the PDCCH during the DRX inactive time periods.

In the first approach there may be a few options for operation. For example, if UE is in DRX mode without configured MG and there is at least one SSB burst outside the DRX active time period from the reference cell, a first option or a second option may be implemented for the first approach. The options may define when a reference cell on a carrier frequency subject to CCA is available for a timing determination for an uplink (UL) transmission of the UE.

FIG. 3 illustrates an example DRX transmission arrangement 300 to illustrate some concepts of the first approach in accordance with some embodiments. In particular, the DRX transmission arrangement 300 illustrates example transmissions that may occur between a gNB and a UE operating in DRX mode. For example, the DRX transmission arrangement 300 illustrates an example DRX cycle of the UE and transmissions that may occur during the DRX cycle that may be utilized for determining a timing for a UL transmission of the UE.

The DRX transmission arrangement 300 includes a first DRX active time period 302, a DRX inactive time period 304, and a second DRX active time period 306 in the illustrated embodiment. A UE may be in a DRX active state during the first DRX active time period 302 and the second DRX active time period 306, and may be in a DRX inactive state during the DRX inactive time period 304. The first DRX active time period 302 and the DRX inactive time period 304 may form a DRX cycle 308.

The DRX transmission arrangement 300 illustrates positions for transmissions between the gNB and the UE. For example, the DRX transmission arrangement 300 illustrates multiple candidate SSB burst positions during which the gNB may transmit an SSB burst to the UE. In particular, the DRX transmission arrangement 300 includes a first candidate SSB burst position 310, a second candidate SSB burst position 312, a third candidate SSB burst position 314, a fourth candidate SSB burst position 316, and a fifth candidate SSB burst position 318. The candidate SSB burst positions may be periodic, where an SMTC period 320 may be between each of the candidate SSB burst positions.

Figure 4:
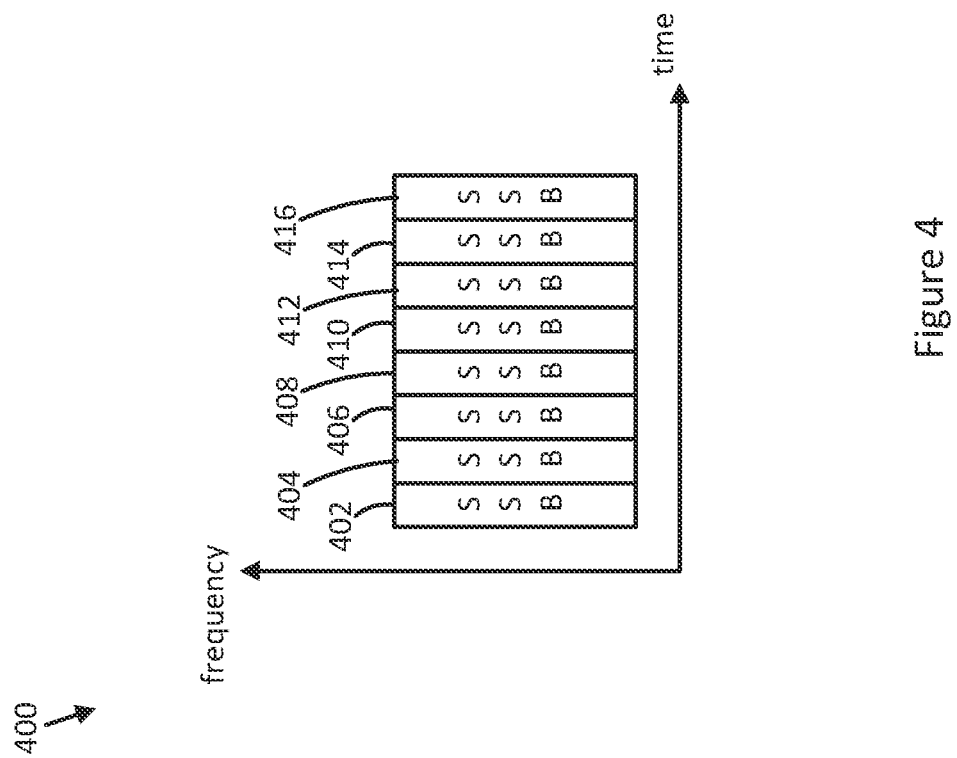
FIG. 4 illustrates an example synchronization signal/physical broadcast channel block burst that may be transmitted by the next generation nodeB in the candidate synchronization signal/physical broadcast channel block burst positions in accordance with some embodiments.

The gNB may transmit an SSB burst in each of the burst positions. An SSB burst may include one or more SSBs. For example, FIG. 4 illustrates an example SSB burst 400 that may be transmitted by the gNB in the candidate SSB burst positions in accordance with some embodiments. In the illustrated embodiment, the SSB burst 400 includes a first candidate SSB position 402, a second candidate SSB position 404, a third candidate SSB position 406, a fourth candidate SSB position 408, a fifth candidate SSB position 410, a sixth candidate SSB position 412, a seventh candidate SSB position 414, and an eighth candidate SSB position 416. The gNB may transmit an SSB in each of the candidate SSB positions. The SSBs transmitted in the candidate SSB positions may be SSBs having the same index, SSBs having different indexes, or some combination thereof. The gNB may perform a CCA before transmission of the SSB burst 400 and/or each of the candidate SSB positions to determine whether the SSB burst 400 and/or SSBs in each of the candidate SSB positions may be transmitted. When a CCA fails, the gNB may avoid transmitting the SSB burst 400 or SSBs in candidate SSB positions associated with the CCA failure. Accordingly, the gNB may not transmit the SSB burst 400 when there is a CCA failure, may transmit a portion of the SSB burst 400 (for example, SSBs may be transmitted in candidate SSB positions associated with CCAs that passed and SSBs may not be transmitted in candidate SSB positions associated with CCAs that failed) when there is a CCA failure, or may transmit the entire SSB burst 400 when none of the CCAs fail.

The DRX transmission arrangement 300 may further include one or more transmission availability periods. For example, the DRX transmission arrangement 300 may include a first transmission availability period 322, a second transmission availability period 324, a third transmission availability period 326, and a fourth transmission availability period 328. The transmission availability periods may be during the DRX active time periods. The transmission availability periods may be time periods where transmissions between the gNB and the UE may be scheduled and where other transmissions (such as the candidate SSB burst positions) are not scheduled.

The DRX transmission arrangement 300 may further include a UE transmission occasion 330. The UE transmission occasion 330 may be an occasion where the UE may transmit to the gNB. For example, the UE transmission occasion 330 may be utilized for a UE transmission, a UE random access channel (RACH), or other UE activities that utilize reference cell timing.

For a first option of the first approach, the reference cell on a carrier frequency subject to CCA may be available at the UE if all SSB burst(s) outside DRX active time period are available (no CCA impact) at UE during the last X ms. X ms is a time threshold and UE may check the SSB burst availability during the last X ms before the time point on which UE is using the reference timing for certain activity. The above certain activity could be, for example, UE transmission. UE random-access channel (RACH), or other UE activities which utilize reference cell timing. In some embodiments, X ms could be, for example, 160 ms. UE may wake up during the X ms to track the SSB bursts inside this X ms. The SSB availability may be: For each SSB, the first two successive candidate SSB positions for the same SSB index within the discovery burst transmission window are not available at the UE due to DL CCA failures at gNB, this SSB is unavailable, otherwise this SSB is available. If at least one SSB is available in a SSB burst, this SSB burst may be available.

For example, the UE may have the UE transmission occasion 330 in the DRX transmission arrangement 300 scheduled for transmission, which may be the activity as described above. The UE may track for SSB bursts for a time threshold 332 prior to the UE transmission occasion 330. The time threshold 332 may begin at a set time period before the UE transmission occasion 330. In some embodiments, the set time period may be 160 ms, but it should be understood that the time may be different in other embodiments.

The time threshold 332 may be within the DRX inactive time period 304. The UE may wake up from a DRX inactive state of the DRX inactive time period 304 during the time threshold 332 to track SSB bursts that the UE may receive during the time threshold 332. For example, the UE may transition from a DRX inactive state during the DRX inactive time period 304 to a DRX active state during the time threshold 332 in some embodiments. In the embodiment shown in the DRX transmission arrangement 300, the UE may identify the third candidate SSB burst position 314 and the fourth candidate SSB burst position 316 that occur during the time threshold 332. The UE may further identify any SSB bursts (such as the SSB burst 400 (FIG. 4)) transmitted by the gNB in the third candidate SSB burst position 314 and the fourth candidate SSB burst position 316.

The UE may then determine whether the SSB bursts during the time threshold 332 are available. In the first option, the UE may determine whether all the SSB bursts within the time threshold 332 are available. In some embodiments, the UE may compare the identified candidate SSB burst positions with the identified SSB bursts received at the UE to determine whether each identified candidate SSB burst position included an SSB burst. The gNB may not transmit an SSB burst in an candidate SSB burst position if a CCA failure corresponding to the candidate SSB burst position occurs. If the UE determines an SSB burst is not received in one or more of the identified candidate SSB burst positions, the UE may determine that not all of the SSB bursts are available and, therefore, the reference cell on the carrier frequency subject to CCA is not available at the UE.

The UE may further determine whether each SSB burst received at the UE is to be considered available based on the SSBs included in the SSB burst. For example, the UE may determine whether the first two successive candidate SSB positions for the same SSB index within the discovery burst transmission window are available at the UE. The first two successive candidate SSB positions for the same SSB index may be available if an SSB corresponding to the SSB index is received by the UE in both the first two successive candidate SSB positions for the SSB index. For example, the first candidate SSB position 402 and the second candidate SSB position 404 of the SSB burst 400 may be candidate SSB positions for a same SSB index. The UE may determine that an SSB is available if the SSB corresponding to the same SSB index are received at the UE in the first candidate SSB position 402 and the second candidate SSB position 404, and may determine the SSB is unavailable if the SSB is not received in either of the first candidate SSB position 402 or the second candidate SSB position 404. While the first candidate SSB position 402 and the second candidate SSB position 404 are used for the example, it should be understood that the candidate SSB positions may be any of the successive candidate SSB positions of the SSB burst 400 that are for an SSB index in the SSB burst 400. The UE may determine that an SSB burst is available if at least one of the SSBs within the SSB burst is determined to be available, and may determine that an SSB burst is unavailable if none of the SSBs within the SSB burst are determined to be available.

The UE may determine whether the reference cell on a carrier frequency subject to CCA is available based on whether all the SSB bursts are determined to be available. In particular, the UE may determine the reference cell to be available if all the SSB bursts are determined to be available, and may determine the reference cell to be unavailable if any of the SSB bursts are determined to be unavailable. If the UE determines the reference cell to be available, the UE may utilize the reference cell to determine a timing of a UL transmission in the UE transmission occasion 330. For example, the UE may measure a timing advance of an available SSB corresponding to the reference cell from one of the available SSB bursts and determine the timing of the UL transmission based on the timing advance.

For a second option of the first approach, the reference cell on a carrier frequency subject to CCA may be available at the UE, if at least one SSB burst outside DRX active time period is available (no CCA impact) at UE during the last X ms. X ms is a time threshold and UE may check the SSB availability during the last X ms before the time point on which UE is using the reference timing for certain activity. The above certain activity could be, for example, UE transmission, UE RACH, or other UE activities which utilize reference cell timing. In some embodiments, X ms could be, for example, 160 ms. UE may wake up during the X ms to track the SSB bursts inside this X ms. The SSB availability may be: For each SSB, the first two successive candidate SSB positions for the same SSB index within the discovery burst transmission window are not available at the UE due to DL CCA failures at gNB, this SSB is unavailable, otherwise this SSB is available. If at least one SSB is available in a SSB burst, this SSB burst is available.

For example, the UE may have the UE transmission occasion 330 in the DRX transmission arrangement 300 scheduled for UL transmission by the UE, which may be the activity as described above. The UE may track for SSB bursts for a time threshold 332 prior to the UE transmission occasion 330. The time threshold 332 may begin at a set time period before the UE transmission occasion 330. In some embodiments, the set time period may be 160 ms, but it should be understood that the time period may be different in other embodiments.

The time threshold 332 may be within the DRX inactive time period 304. The UE may wake up from a DRX inactive state of the DRX inactive time period 304 during the time threshold 332 to track SSB bursts that the UE may receive during the time threshold 332. For example, the UE may transition from a DRX inactive state during the DRX inactive time period 304 to a DRX active state during the time threshold 332 in some embodiments. In the embodiment shown in the DRX transmission arrangement 300, the UE may identify the third candidate SSB burst position 314 and the fourth candidate SSB burst position 316 that occur during the time threshold 332. The UE may further identify any SSB bursts (such as the SSB burst 400 (FIG. 4)) transmitted by the gNB in the third candidate SSB burst position 314 and the fourth candidate SSB burst position 316.

The UE may then determine whether the SSB bursts during the time threshold 332 are available. In the second option, the UE may determine whether at least one of the SSB bursts within the time threshold 332 are available. In some embodiments, the UE may compare the identified candidate SSB burst positions with the identified SSB bursts received at the UE to determine whether each identified candidate SSB burst position included an SSB burst. The gNB may not transmit an SSB burst in an candidate SSB burst position if a CCA failure corresponding to the candidate SSB burst position occurs. If the UE determines SSB bursts are not received in any of the identified candidate SSB burst positions, the UE may determine that none of the SSB bursts are available and, therefore, the reference cell on the carrier frequency subject to CCA is not available at the UE.

The UE may further determine whether each SSB burst received at the UE is to be considered available based on the SSBs included in the SSB burst. For example, the UE may determine whether the first two successive candidate SSB positions for the same SSB index within the discovery burst transmission window are available at the UE. The first two successive candidate SSB positions for the same SSB index may be available if an SSB corresponding to the SSB index is received by the UE in both the first two successive candidate SSB positions for the SSB index. For example, the first candidate SSB position 402 and the second candidate SSB position 404 of the SSB burst 400 may be candidate SSB positions for a same SSB index. The UE may determine that an SSB is available if the SSB corresponding to the same SSB index are received at the UE in the first candidate SSB position 402 and the second candidate SSB position 404, and may determine the SSB is unavailable if the SSB is not received in either of the first candidate SSB position 402 or the second candidate SSB position 404. While the first candidate SSB position 402 and the second candidate SSB position 404 are used for the example, it should be understood that the candidate SSB positions may be any of the successive candidate SSB positions of the SSB burst 400 that are for an SSB index in the SSB burst 400. The UE may determine that an SSB burst is available if at least one of the SSBs within the SSB burst is determined to be available, and may determine that an SSB burst is unavailable if none of the SSBs within the SSB burst are determined to be available.

The UE may determine whether the reference cell on a carrier frequency subject to CCA is available based on whether at least one of the SSB bursts are determined to be available. In particular, the UE may determine the reference cell to be available if at least one of the SSB bursts are determined to be available, and may determine the reference cell to be unavailable if all of the SSB bursts are determined to be unavailable. If the UE determines the reference cell to be available, the UE may utilize the reference cell to determine a timing of a UL transmission in the UE transmission occasion 330. For example, the UE may measure a timing advance of an available SSB corresponding to the reference cell from one of the available SSB bursts and determine the timing of the UL transmission based on the timing advance.

Otherwise, if UE is in DRX mode without configured MG and there is not any SSB burst outside the DRX active time period from the reference cell, the criteria to determine the reference cell availability would be fallback to option 4 as mentioned in above. In particular, the term reference cell on a carrier frequency subject to CCA is not available at the UE may refer to when at least one SSB is configured by gNB, but the first two successive candidate SSB positions for the same SSB index within the discovery burst transmission window may not be available at the UE due to DL CCA failures at gNB during the last max{physical layer (PHY) measurement time interval of reference cell, 160 ms}; otherwise the reference cell on the carrier frequency subject to CCA is considered as available at the UE.

When UE performs intra-frequency measurement on reference cell without measurement gap (MG), PHY measurement time interval of reference cell may be as illustrated in FIG. 1. For example, FIG. 1 illustrates a table 100 providing example PHY measurement time intervals based on DRX cycle for intra-frequency measurement on a reference cell without MG. The table 100 includes DRX cycles 102 and PHY measurement time intervals 104 for each DRX cycle. As can be seen the PHY measurement time interval for each DRX cycle may be defined based on a parameter $K_p$, an SMTC period, a cell-specific scaling factor ($CSSF_{intra}$), a length of a DRX cycle (DRX cycle), or some combination thereof.

When UE performs intra-frequency measurement on reference cell with MG, PHY measurement time interval of reference cell may be as illustrated in FIG. 2. For example, FIG. 2 illustrates a table 200 providing example PHY measurement time intervals based on DRX cycle for intra-frequency measurement on a reference cell with MG. The table 200 includes DRX cycles 202 and PHY measurement time intervals 204 for each DRX cycle. As can be seen the PHY measurement time interval for each DRX cycle may be defined based on an SMTC period, a cell-specific scaling factor ($CSSF_{intra}$), a length of a DRX cycle (DRX cycle), a measurement gap repetition period (MGRP), or some combination thereof.

A second approach for a DRX mode of a UE may be applied to UEs configured in DRX mode. In the second approach, there may be four options for operation. For example, if UE is in DRX mode with configured MG and there is at least one SSB burst outside the DRX active time period from the reference cell, a first option, a second option, a third option, or a fourth option may be implemented for the first approach. The options may define when a reference cell on a carrier frequency subject to CCA is available for a timing determination for a UL transmission of the UE.

Figure 5:
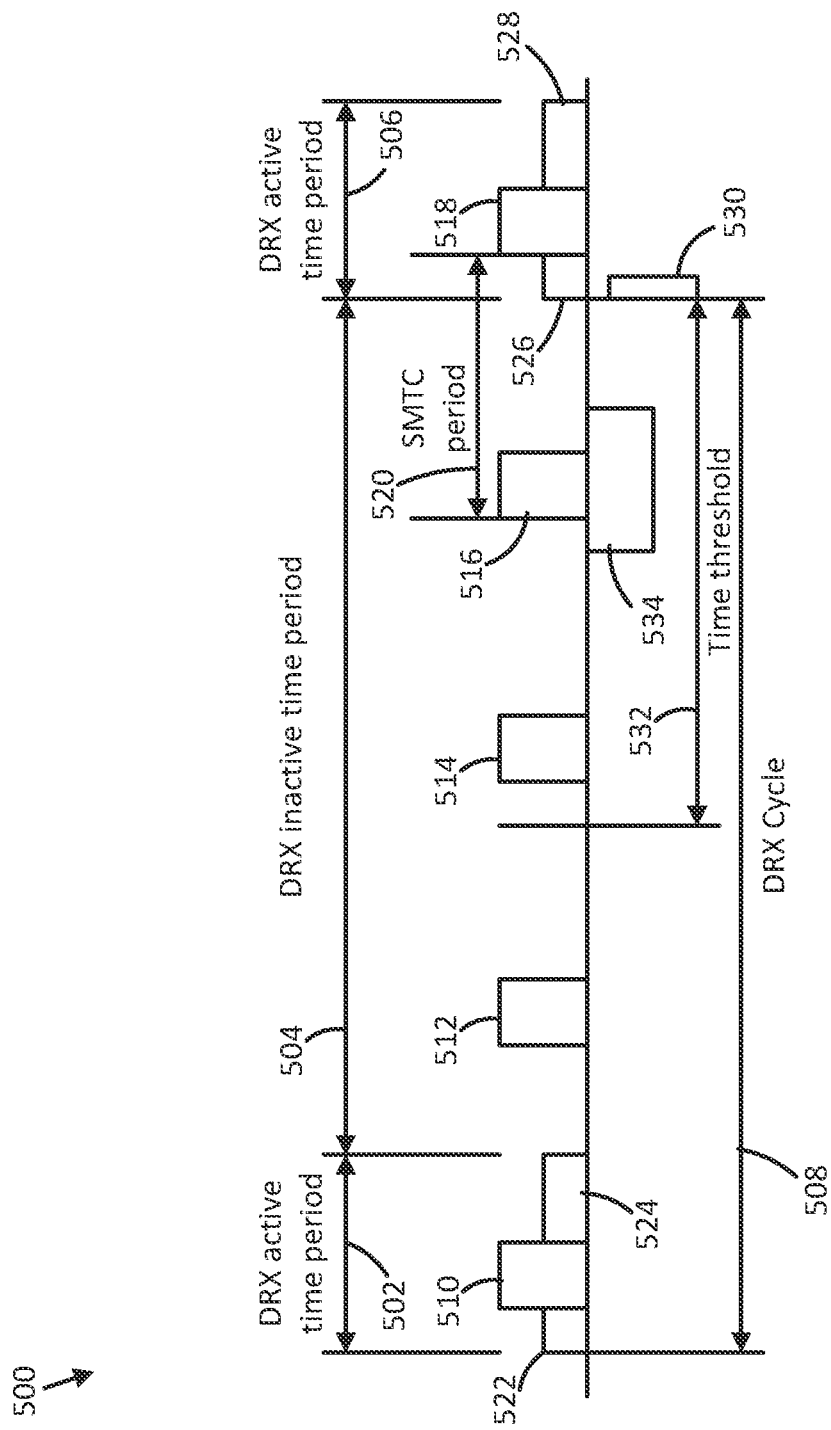
FIG. 5 illustrates an example discontinuous reception transmission arrangement to illustrate some concepts of the second approach in accordance with some embodiments.

FIG. 5 illustrates an example DRX transmission arrangement 500 to illustrate some concepts of the second approach in accordance with some embodiments. In particular, the DRX transmission arrangement 500 illustrates example transmissions that may occur between a gNB and a UE operating in DRX mode. For example, the DRX transmission arrangement 500 illustrates an example DRX cycle of the UE and transmissions that may occur during the DRX cycle that may be utilized for determining a timing for a UL transmission of the UE.

The DRX transmission arrangement 500 includes a first DRX active time period 502, a DRX inactive time period 504, and a second DRX active time period 506 in the illustrated embodiment. A UE may be in a DRX active state during the first DRX active time period 502 and the second DRX active time period 506, and may be in a DRX inactive state during the DRX inactive time period 504. The first DRX active time period 502 and the DRX inactive time period 504 may form a DRX cycle 508.

The DRX transmission arrangement 500 illustrates positions for transmissions between the gNB and the UE. For example, the DRX transmission arrangement 500 illustrates multiple candidate SSB burst positions during which the gNB may transmit an SSB burst to the UE. In particular, the DRX transmission arrangement 500 includes a first candidate SSB burst position 510, a second candidate SSB burst position 512, a third candidate SSB burst position 514, a fourth candidate SSB burst position 516, and a fifth candidate SSB burst position 518. The candidate SSB burst positions may be periodic, where an SMTC period 520 may be between each of the candidate SSB burst positions.

The gNB may transmit an SSB burst in each of the burst positions. An SSB burst may include one or more SSBs. For example, FIG. 4 illustrates an example SSB burst 400 that may be transmitted by the gNB in the candidate SSB burst positions in accordance with some examples. In the illustrated embodiment, the SSB burst 400 includes a first candidate SSB position 402, a second candidate SSB position 404, a third candidate SSB position 406, a fourth candidate SSB position 408, a fifth candidate SSB position 410, a sixth candidate SSB position 412, a seventh candidate SSB position 414, and an eighth candidate SSB position 416. The gNB may transmit an SSB in each of the candidate SSB positions. The SSBs transmitted in the candidate SSB positions may be SSBs having the same index, SSBs having different indexes, or some combination thereof. The gNB may perform a CCA before transmission of the SSB burst 400 and/or each of the candidate SSB positions to determine whether the SSB burst 400 and/or SSBs in each of the candidate SSB positions may be transmitted. When a CCA fails, the gNB may avoid transmitting the SSB burst 400 or SSBs in candidate SSB positions associated with the CCA failure. Accordingly, the gNB may not transmit the SSB burst 400 when there is a CCA failure, may transmit a portion of the SSB burst 400 (for example, SSBs may be transmitted in candidate SSB positions associated with CCAs that passed and SSBs may not be transmitted in candidate SSB positions associated with CCAs that failed) when there is a CCA failure, or may transmit the entire SSB burst 400 when none of the CCAs fail.

The DRX transmission arrangement 500 may further include one or more transmission availability periods. For example, the DRX transmission arrangement 500 may include a first transmission availability period 522, a second transmission availability period 524, a third transmission availability period 526, and a fourth transmission availability period 528. The transmission availability periods may be during the DRX active time periods. The transmission availability periods may be time periods where transmissions between the gNB and the UE may be scheduled and where other transmissions (such as the candidate SSB burst positions) are not scheduled.

The DRX transmission arrangement 500 may further include a UE transmission occasion 530. The UE transmission occasion 530 may be an occasion where the UE may transmit to the gNB. For example, the UE transmission occasion 530 may be utilized for a UE transmission, a UE random access channel (RACH), or other UE activities that utilize reference cell timing.

The DRX transmission arrangement 500 may further include possible MGs. In particular, the DRX transmission arrangement 500 may include a MG 534 in the illustrated embodiment. The MG 534 is included to show possible implementations and outcomes of the second approach for the DRX mode. The MG 534 may be a time reserved by the UE for performing particular measurements.

For a first option of the second approach, the reference cell on a carrier frequency subject to CCA may be available at the UE, if all SSB burst(s) outside DRX active time period are available (no CCA impact) at UE during the last X ms regardless if those SSB bursts are overlapped with MG or not. X ms is a time threshold and UE may check the above SSB burst availability during the last X ms before the time point on which UE is using the reference timing for certain activity. The above certain activity could be, for example, UE Tx transmission, UE RACH, or other UE activities which utilize reference cell timing. X ms could be, for example, 160 ms in some embodiments. UE may wake up during the X ms to track the SSB bursts inside this X ms. The SSB availability may be: For each SSB, the first two successive candidate SSB positions for the same SSB index within the discovery burst transmission window are not available at the UE due to DL CCA failures at gNB, this SSB is unavailable, otherwise this SSB is available. If at least one SSB is available in a SSB burst, this SSB burst may be available.

For example, the UE may have the UE transmission occasion 530 in the DRX transmission arrangement 500 scheduled for UL transmission by the UE, which may be the activity as described above. The UE may track for SSB bursts for a time threshold 532 prior to the UE transmission occasion 530. The time threshold 532 may begin at a set time period before the UE transmission occasion 530. In some embodiments, the set time period may be 160 ms, but it should be understood that the time period may be different in other embodiments.

The time threshold 532 may be within the DRX inactive time period 504. The UE may wake up from a DRX inactive state of the DRX inactive time period 504 during the time threshold 532 to track SSB bursts that the UE may receive during the time threshold 532. For example, the UE may transition from a DRX inactive state during the DRX inactive time period 504 to a DRX active state during the time threshold 532 in some embodiments. In the embodiment shown in the DRX transmission arrangement 500, the UE may identify the third candidate SSB burst position 514 and the fourth candidate SSB burst position 516 that occur during the time threshold 532. The UE may further identify any SSB bursts (such as the SSB burst 400 (FIG. 4)) transmitted by the gNB in the third candidate SSB burst position 514 and the fourth candidate SSB burst position 516.

The UE may then determine whether the SSB bursts during the time threshold 532 are available. In the first option, the UE may determine whether all the SSB bursts within the time threshold 532 are available regardless whether the SSB bursts overlap with an MG of the UE. In some embodiments, the UE may compare the identified candidate SSB burst positions with the identified SSB bursts received at the UE to determine whether each identified candidate SSB burst position included an SSB burst. The gNB may not transmit an SSB burst in an candidate SSB burst position if a CCA failure corresponding to the candidate SSB burst position occurs. If the UE determines an SSB burst is not received in one or more of the identified candidate SSB burst positions, the UE may determine that not all of the SSB bursts are available and, therefore, the reference cell on the carrier frequency subject to CCA is not available at the UE.

The UE may further determine whether each SSB burst received at the UE is to be considered available based on the SSBs included in the SSB burst. For example, the UE may determine whether the first two successive candidate SSB positions for the same SSB index within the discovery burst transmission window are available at the UE. The first two successive candidate SSB positions for the same SSB index may be available if an SSB corresponding to the SSB index is received by the UE in both the first two successive candidate SSB positions for the SSB index. For example, the first candidate SSB position 402 and the second candidate SSB position 404 of the SSB burst 400 may be candidate SSB positions for a same SSB index. The UE may determine that an SSB is available if the SSB corresponding to the same SSB index are received at the UE in the first candidate SSB position 402 and the second candidate SSB position 404, and may determine the SSB is unavailable if the SSB is not received in either of the first candidate SSB position 402 or the second candidate SSB position 404. While the first candidate SSB position 402 and the second candidate SSB position 404 are used for the example, it should be understood that the candidate SSB positions may be any of the successive candidate SSB positions of the SSB burst 400 that are for an SSB index in the SSB burst 400. The UE may determine that an SSB burst is available if at least one of the SSBs within the SSB burst is determined to be available, and may determine that an SSB burst is unavailable if none of the SSBs within the SSB burst are determined to be available.

The UE may determine whether the reference cell on a carrier frequency subject to CCA is available based on whether all the SSB bursts are determined to be available. In particular, the UE may determine the reference cell to be available if all the SSB bursts are determined to be available, and may determine the reference cell to be unavailable if any of the SSB bursts are determined to be unavailable. If the UE determines the reference cell to be available, the UE may utilize the reference cell to determine a timing of a UL transmission in the UE transmission occasion 530. For example, the UE may measure a timing advance of an available SSB corresponding to the reference cell from one of the available SSB bursts and determine the timing of the UL transmission based on the timing advance.

For a second option of the second approach, the reference cell on a carrier frequency subject to CCA may be available at the UE, if at least one SSB burst outside DRX active time period is available (no CCA impact) at UE during the last X ms regardless if those SSB bursts are overlapped with MG or not. X ms is a time threshold and UE may check the above SSB availability during the last X ms before the time point on which UE is using the reference timing for certain activity. The above certain activity could be, for example, UE Tx transmission, UE RACH, or other UE activities which utilize reference cell timing. X ms could be, for example, 160 ms in some embodiments. UE may wake up during the X ms to track the SSB bursts inside this X ms. The SSB availability may be: For each SSB, the first two successive candidate SSB positions for the same SSB index within the discovery burst transmission window are not available at the UE due to DL CCA failures at gNB, this SSB is unavailable, otherwise this SSB is available. If at least one SSB is available in a SSB burst, this SSB burst may be available.

For example, the UE may have the UE transmission occasion 530 in the DRX transmission arrangement 500 scheduled for transmission, which may be the activity as described above. The UE may track for SSB bursts for a time threshold 532 prior to the UE transmission occasion 530. The time threshold 532 may begin at a set time period before the UE transmission occasion 530. In some embodiments, the set time period may be 160 ms, but it should be understood that the time may be different in other embodiments.

The time threshold 532 may be within the DRX inactive time period 504. The UE may wake up from a DRX inactive state of the DRX inactive time period 504 during the time threshold 532 to track SSB bursts that the UE may receive during the time threshold 532. For example, the UE may transition from a DRX inactive state during the DRX inactive time period 504 to a DRX active state during the time threshold 532 in some embodiments. In the embodiment shown in the DRX transmission arrangement 500, the UE may identify the third candidate SSB burst position 514 and the fourth candidate SSB burst position 516 that occur during the time threshold 532. The UE may further identify any SSB bursts (such as the SSB burst 400 (FIG. 4)) transmitted by the gNB in the third candidate SSB burst position 514 and the fourth candidate SSB burst position 516.

The UE may then determine whether the SSB bursts during the time threshold 532 are available. In the second option, the UE may determine whether at least one of the SSB bursts within the time threshold 532 are available. In some embodiments, the UE may compare the identified candidate SSB burst positions with the identified SSB bursts received at the UE to determine whether each identified candidate SSB burst position included an SSB burst. The gNB may not transmit an SSB burst in an candidate SSB burst position if a CCA failure corresponding to the candidate SSB burst position occurs. If the UE determines SSB bursts are not received in any of the identified candidate SSB burst positions, the UE may determine that none of the SSB bursts are available and, therefore, the reference cell on the carrier frequency subject to CCA is not available at the UE.

The UE may further determine whether each SSB burst received at the UE is to be considered available based on the SSBs included in the SSB burst. For example, the UE may determine whether the first two successive candidate SSB positions for the same SSB index within the discovery burst transmission window are available at the UE. The first two successive candidate SSB positions for the same SSB index may be available if an SSB corresponding to the SSB index is received by the UE in both the first two successive candidate SSB positions for the SSB index. For example, the first candidate SSB position 402 and the second candidate SSB position 404 of the SSB burst 400 may be candidate SSB positions for a same SSB index. The UE may determine that an SSB is available if the SSB corresponding to the same SSB index are received at the UE in the first candidate SSB position 402 and the second candidate SSB position 404, and may determine the SSB is unavailable if the SSB is not received in either of the first candidate SSB position 402 or the second candidate SSB position 404. While the first candidate SSB position 402 and the second candidate SSB position 404 are used for the example, it should be understood that the candidate SSB positions may be any of the successive candidate SSB positions of the SSB burst 400 that are for an SSB index in the SSB burst 400. The UE may determine that an SSB burst is available if at least one of the SSBs within the SSB burst is determined to be available, and may determine that an SSB burst is unavailable if none of the SSBs within the SSB burst are determined to be available.

The UE may determine whether the reference cell on a carrier frequency subject to CCA is available based on whether at least one of the SSB bursts are determined to be available. In particular, the UE may determine the reference cell to be available if at least one of the SSB bursts are determined to be available, and may determine the reference cell to be unavailable if all of the SSB bursts are determined to be unavailable. If the UE determines the reference cell to be available, the UE may utilize the reference cell to determine a timing of a UL transmission in the UE transmission occasion 530. For example, the UE may measure a timing advance of an available SSB corresponding to the reference cell from one of the available SSB bursts and determine the timing of the UL transmission based on the timing advance.

For a third option of the second approach, the reference cell on a carrier frequency subject to CCA may be available at the UE, if all SSB burst(s) outside DRX active time period are available (no CCA impact) at UE during the last X ms. The above "all SSB burst(s)" are the ones that are inside the MG if that reference cell measurement is measured with the MG, or outside MG if that reference cell measurement is measured without MG. X ms is a time threshold and UE may check the above SSB burst availability during the last X ms before the time point on which UE is using the reference timing for certain activity. The above certain activity could be, for example, UE Tx transmission, UE RACH, or other UE activities which utilize reference cell timing. X ms could be, for example, 160 ms in some embodiments. UE may wake up during the X ms to track the SSB bursts inside this X ms. The SSB availability may be: For each SSB, the first two successive candidate SSB positions for the same SSB index within the discovery burst transmission window are not available at the UE due to DL CCA failures at gNB, this SSB is unavailable, otherwise this SSB is available. If at least one SSB is available in a SSB burst, this SSB burst may be available.

For example, the UE may have the UE transmission occasion 530 in the DRX transmission arrangement 500 scheduled for UL transmission by the UE, which may be the activity as described above. The UE may track for SSB bursts for a time threshold 532 prior to the UE transmission occasion 530. The time threshold 532 may begin at a set time period before the UE transmission occasion 530. In some embodiments, the set time period may be 160 ms, but it should be understood that the time may be different in other embodiments.

The time threshold 532 may be within the DRX inactive time period 504. The UE may wake up from a DRX inactive state of the DRX inactive time period 504 during the time threshold 532 to track SSB bursts that the UE may receive during the time threshold 532. For example, the UE may transition from a DRX inactive state during the DRX inactive time period 504 to a DRX active state during the time threshold 532 in some embodiments. In the embodiment shown in the DRX transmission arrangement 300, the UE may identify the third candidate SSB burst position 514 and the fourth candidate SSB burst position 516 that occur during the time threshold 532. The UE may further identify any SSB bursts (such as the SSB burst 400 (FIG. 4)) transmitted by the gNB in the third candidate SSB burst position 514 and the fourth candidate SSB burst position 516.

The UE may then determine whether the SSB bursts during the time threshold 532 are available. In the third option, the UE may determine whether all SSB bursts within or outside of the MG, depending on whether the SSB burst to be utilized for the reference cell measurement is measured with the MG or without the MG, are available. For example, the UE may identify a reference cell to be utilized for measurement to determine a timing for a UL transmission in the UE transmission occasion 530. Assuming the UE receives an SSB related to the reference cell in one of the SSB bursts, the UE may identify the SSB related to the reference cell and the SSB burst in which the SSB is included. The UE may then determine if SSB related to the reference cell is to be measured with the MG 534. If the SSB is to be measured with the MG 534, the UE may determine whether all the SSB bursts located within the time threshold 532 and the MG 534 are available. In this instance, the UE may ignore the availability of the SSB bursts outside of the MG 534. If the SSB is to be measured without the MG 534, the UE may determine whether all the SSB bursts located within the time threshold 532 and outside of the MG 534 are available. In this instance, the UE may ignore the availability of the SSB bursts within the MG 534.

For example, the UE may determine that the SSB related to the reference cell for measurement is located within the fourth candidate SSB burst position 516 in some instances, where the fourth candidate SSB burst position 516 is located within the MG 534 and the SSB within the fourth candidate SSB burst position 516 is to be measured with the MG 534. In these instances, the UE may determine whether all the SSB bursts located within the time threshold 532 and the MG 534 are available. Accordingly, the UE may ignore the availability of the SSB bursts within the time threshold 532 and outside of the MG 534, such as any SSB bursts within the third candidate SSB burst position 514 may have their availability ignored. In contrast, the UE may determine that the SSB related to the reference cell for measurement is located within the third candidate SSB burst position 514 in some instances, where the third candidate SSB burst position 514 is located outside of the MG 534 and the SSB within the third candidate SSB burst position 514 is to be measured without the MG 534. In these instances, the UE may determine whether all the SSB bursts located within the time threshold 532 and outside of the MG 534 are available. Accordingly, the UE may ignore the availability of the SSB bursts within the time threshold 532 and the MG 534, such as any SSB bursts within the fourth candidate SSB burst position 516 may have their availability ignored.

In some embodiments, the UE may determine whether the SSBs bursts are available based on whether the SSB bursts were received at the UE. The UE may compare the identified candidate SSB burst positions with the identified SSB bursts received at the UE to determine whether each identified candidate SSB burst position included an SSB burst. The gNB may not transmit an SSB burst in an candidate SSB burst position if a CCA failure corresponding to the candidate SSB burst position occurs. If the UE determines that an SSB burst is not received in an identified candidate SSB burst position, the UE may determine that the SSB burst is not available.

The UE may further determine whether each SSB burst received at the UE is to be considered available based on the SSBs included in the SSB burst. For example, the UE may determine whether the first two successive candidate SSB positions for the same SSB index within the discovery burst transmission window are available at the UE. The first two successive candidate SSB positions for the same SSB index may be available if an SSB corresponding to the SSB index is received by the UE in both the first two successive candidate SSB positions for the SSB index. For example, the first candidate SSB position 402 and the second candidate SSB position 404 of the SSB burst 400 may be candidate SSB positions for a same SSB index. The UE may determine that an SSB is available if the SSB corresponding to the same SSB index are received at the UE in the first candidate SSB position 402 and the second candidate SSB position 404, and may determine the SSB is unavailable if the SSB is not received in either of the first candidate SSB position 402 or the second candidate SSB position 404. While the first candidate SSB position 402 and the second candidate SSB position 404 are used for the example, it should be understood that the candidate SSB positions may be any of the successive candidate SSB positions of the SSB burst 400 that are for an SSB index in the SSB burst 400. The UE may determine that an SSB burst is available if at least one of the SSBs within the SSB burst is determined to be available, and may determine that an SSB burst is unavailable if none of the SSBs within the SSB burst are determined to be available.

The UE may determine whether the reference cell on a carrier frequency subject to CCA is available based on whether all of the SSB bursts either within the MG or outside of the MG, in accordance with whether the SSB to be utilized for measuring the timing for the UL transmission of the UE is measured with the MG or measured without the MG, are determined to be available. In particular, the UE may determine the reference cell to be available if all of the SSB bursts either within the MG or outside of the MG are determined to be available, and may determine the reference cell to be unavailable if any of the SSB bursts within the MG or outside of the MG are determined to be unavailable. If the UE determines the reference cell to be available, the UE may utilize the reference cell to determine a timing of a UL transmission in the UE transmission occasion 530. For example, the UE may measure a timing advance of an available SSB corresponding to the reference cell from one of the available SSB bursts and determine the timing of the UL transmission based on the timing advance.

For a fourth option of the second approach, the reference cell on a carrier frequency subject to CCA may be available at the UE, if at least one SSB burst outside DRX active time period is available (no CCA impact) at UE during the last X ms. The above "at least one SSB burst" is the one that is inside MG if that reference cell measurement is measured with the MG, or outside MG if that reference cell measurement is measured without the MG. X ms is a time threshold and UE may check the above SSB availability during the last X ms before the time point on which UE is using the reference timing for certain activity. The above certain activity could be, for example, UE Tx transmission, UE RACH, or other UE activities which utilize reference cell timing. X ms could be, for example, 160 ms in some embodiments. UE may wake up during the X ms to track the SSB bursts inside this X ms. The SSB availability may be: For each SSB, the first two successive candidate SSB positions for the same SSB index within the discovery burst transmission window are not available at the UE due to DL CCA failures at gNB, this SSB is unavailable, otherwise this SSB is available. If at least one SSB is available in a SSB burst, this SSB burst may be available.

For example, the UE may have the UE transmission occasion 530 in the DRX transmission arrangement 500 scheduled for UL transmission by the UE, which may be the activity as described above. The UE may track for SSB bursts for a time threshold 532 prior to the UE transmission occasion 530. The time threshold 532 may begin at a set time period before the UE transmission occasion 530. In some embodiments, the set time period may be 160 ms, but it should be understood that the time may be different in other embodiments.

The time threshold 532 may be within the DRX inactive time period 504. The UE may wake up from a DRX inactive state of the DRX inactive time period 504 during the time threshold 532 to track SSB bursts that the UE may receive during the time threshold 532. For example, the UE may transition from a DRX inactive state during the DRX inactive time period 504 to a DRX active state during the time threshold 532 in some embodiments. In the embodiment shown in the DRX transmission arrangement 300, the UE may identify the third candidate SSB burst position 514 and the fourth candidate SSB burst position 516 that occur during the time threshold 532. The UE may further identify any SSB bursts (such as the SSB burst 400 (FIG. 4))

transmitted by the gNB in the third candidate SSB burst position 514 and the fourth candidate SSB burst position 516.

The UE may then determine whether the SSB bursts during the time threshold 532 are available. In the fourth option, the UE may determine whether at least one SSB burst within or outside of the MG, depending on whether the SSB burst to be utilized for the reference cell measurement is measured with the MG or measured without the MG, is available. For example, the UE may identify a reference cell to be utilized for measurement to determine a timing for a UL transmission in the UE transmission occasion 530. Assuming the UE receives an SSB related to the reference cell in one of the SSB bursts, the UE may identify the SSB related to the reference cell and the SSB burst in which the SSB is included. The UE may then determine if SSB related to the reference cell is located within the MG 534 and is to be measured with the MG 534. If the SSB is located within the MG 534 and the SSB is to be measured with the MG 534, the UE may determine whether at least one SSB burst located within the time threshold 532 and the MG 534 is available. In this instance, the UE may ignore the availability of the SSB bursts outside of the MG 534. If the SSB is located outside of the MG 534 and the SSB is to be measured without the MG 534, the UE may determine whether at least one the SSB burst located within the time threshold 532 and outside of the MG 534 are available. In this instance, the UE may ignore the availability of the SSB bursts within the MG 534.

For example, the UE may determine that the SSB related to the reference cell for measurement is located within the fourth candidate SSB burst position 516 in some instances, where the fourth candidate SSB burst position 516 is located within the MG 534 and the SSB is to be measured with the MG 534. In these instances, the UE may determine whether at least one SSB burst located within the time threshold 532 and the MG 534 is available. Accordingly, the UE may ignore the availability of the SSB bursts within the time threshold 532 and outside of the MG 534, such as any SSB bursts within the third candidate SSB burst position 514 may have their availability ignored. In contrast, the UE may determine that the SSB related to the reference cell for measurement is located within the third candidate SSB burst position 514 in some instances, where the third candidate SSB burst position 514 is located outside of the MG 534 and the SSB is to be measured without the MG 534. In these instances, the UE may determine whether at least one SSB burst located within the time threshold 532 and outside of the MG 534 are available. Accordingly, the UE may ignore the availability of the SSB bursts within the time threshold 532 and the MG 534, such as any SSB bursts within the fourth candidate SSB burst position 516 may have their availability ignored.

In some embodiments, the UE may determine whether the SSBs bursts are available based on whether the SSB bursts were received at the UE. The UE may compare the identified candidate SSB burst positions with the identified SSB bursts received at the UE to determine whether each identified candidate SSB burst position included an SSB burst. The gNB may not transmit an SSB burst in an candidate SSB burst position if a CCA failure corresponding to the candidate SSB burst position occurs. If the UE determines that an SSB burst is not received in an identified candidate SSB burst position, the UE may determine that the SSB burst is not available.

The UE may further determine whether each SSB burst received at the UE is to be considered available based on the SSBs included in the SSB burst. For example, the UE may determine whether the first two successive candidate SSB positions for the same SSB index within the discovery burst transmission window are available at the UE. The first two successive candidate SSB positions for the same SSB index may be available if an SSB corresponding to the SSB index is received by the UE in both the first two successive candidate SSB positions for the SSB index. For example, the first candidate SSB position 402 and the second candidate SSB position 404 of the SSB burst 400 may be candidate SSB positions for a same SSB index. The UE may determine that an SSB is available if the SSB corresponding to the same SSB index are received at the UE in the first candidate SSB position 402 and the second candidate SSB position 404, and may determine the SSB is unavailable if the SSB is not received in either of the first candidate SSB position 402 or the second candidate SSB position 404. While the first candidate SSB position 402 and the second candidate SSB position 404 are used for the example, it should be understood that the candidate SSB positions may be any of the successive candidate SSB positions of the SSB burst 400 that are for an SSB index in the SSB burst 400. The UE may determine that an SSB burst is available if at least one of the SSBs within the SSB burst is determined to be available, and may determine that an SSB burst is unavailable if none of the SSBs within the SSB burst are determined to be available.

The UE may determine whether the reference cell on a carrier frequency subject to CCA is available based on whether at least one of the SSB bursts either within the MG or outside of the MG, in accordance with whether the SSB to be utilized for measuring the timing for the UL transmission of the UE is to be measured with the MG or measured without the MG, is determined to be available. In particular, the UE may determine the reference cell to be available if at least one of the SSB bursts either within the MG or outside of the MG is determined to be available, and may determine the reference cell to be unavailable if all of the SSB bursts within the MG or outside of the MG are determined to be unavailable. If the UE determines the reference cell to be available, the UE may utilize the reference cell to determine a timing of a UL transmission in the UE transmission occasion 530. For example, the UE may measure a timing advance of an available SSB corresponding to the reference cell from one of the available SSB bursts and determine the timing of the UL transmission based on the timing advance.

Otherwise, if UE is in DRX mode without configured MG and there is not any SSB burst outside the DRX active time period from the reference cell, the criteria to determine the reference cell availability would be fallback to option 4 as mentioned in above. In particular, the term reference cell on a carrier frequency subject to CCA is not available at the UE may refer to when at least one SSB is configured by gNB, but the first two successive candidate SSB positions for the same SSB index within the discovery burst transmission window may not be available at the UE due to DL CCA failures at gNB during the last max{physical layer (PHY) measurement time interval of reference cell, 160 ms}; otherwise the reference cell on the carrier frequency subject to CCA is considered as available at the UE.

When UE performs intra-frequency measurement on reference cell without MG, PHY measurement time interval of reference cell may be as illustrated in FIG. 1. For example, FIG. 1 illustrates a table 100 providing example PHY measurement time intervals based on DRX cycle for intra-frequency measurement on a reference cell without MG. The table 100 includes DRX cycles 102 and PHY measurement time intervals 104 for each DRX cycle. As can be seen the PHY measurement time interval for each DRX cycle may be defined based on a parameter $K_p$, an SMTC period, a cell-specific scaling factor ($CSSF_{intra}$), a length of a DRX cycle (DRX cycle), or some combination thereof.

When UE performs intra-frequency measurement on reference cell with MG, PHY measurement time interval of reference cell may be as illustrated in FIG. 2. For example, FIG. 2 illustrates a table 200 providing example PHY measurement time intervals based on DRX cycle for intra-frequency measurement on a reference cell with MG. The table 200 includes DRX cycles 202 and PHY measurement time intervals 204 for each DRX cycle. As can be seen the PHY measurement time interval for each DRX cycle may be defined based on an SMTC period, a cell-specific scaling factor ($CSSF_{intra}$), a length of a DRX cycle (DRX cycle), a measurement gap repetition period (MGRP), or some combination thereof.

A third approach may be applied for determining the timing of a UL transmission in a UE transmission occasion. For example, in section 7.1.2 of TS 38.133, the term reference cell on a carrier frequency subject to CCA is not available at the UE may refer to when at least one SSB is configured by gNB, but the first two successive candidate SSB positions for the same SSB index within the discovery burst transmission window are not available at the UE due to DL CCA failures at gNB during the last min {PHY measurement time interval of reference cell, Y ms}. Otherwise the reference cell on the carrier frequency subject to CCA may be considered as available at the UE. The value of Y may be longer than an SMTC period (such as the SMTC period 520 (FIG. 5)), and may be much longer than the SMTC period in some embodiments. Y may be greater than 160 ms. For example, Y may be equal to 1280 ms in some embodiments.

Figure 6:
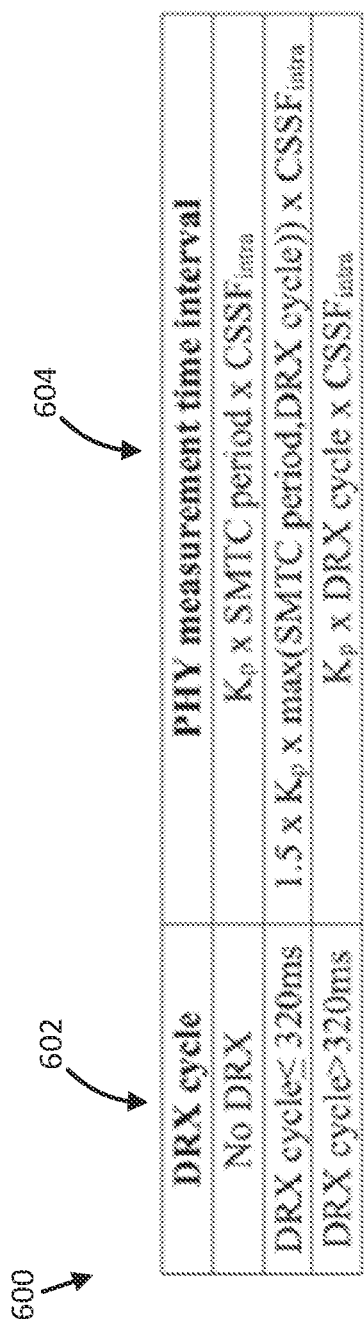
FIG. 6 illustrates a table providing example physical layer measurement time intervals based on discontinuous reception cycle for intra-frequency measurement on a reference cell without measurement gap in accordance with some embodiments.

When UE performs intra-frequency measurement on reference cell without MG, PHY measurement time interval of reference cell may be as illustrated in FIG. 6. For example, FIG. 6 illustrates a table 600 providing example PHY measurement time intervals based on DRX cycle for intra-frequency measurement on a reference cell without MG in accordance with some embodiments. The table 600 includes DRX cycles 602 and PHY measurement time intervals 604 for each DRX cycle. As can be seen the PHY measurement time interval for each DRX cycle may be defined based on a parameter $K_p$, an SMTC period, a cell-specific scaling factor ($CSSF_{intra}$), a length of a DRX cycle (DRX cycle), or some combination thereof.

Figure 7:
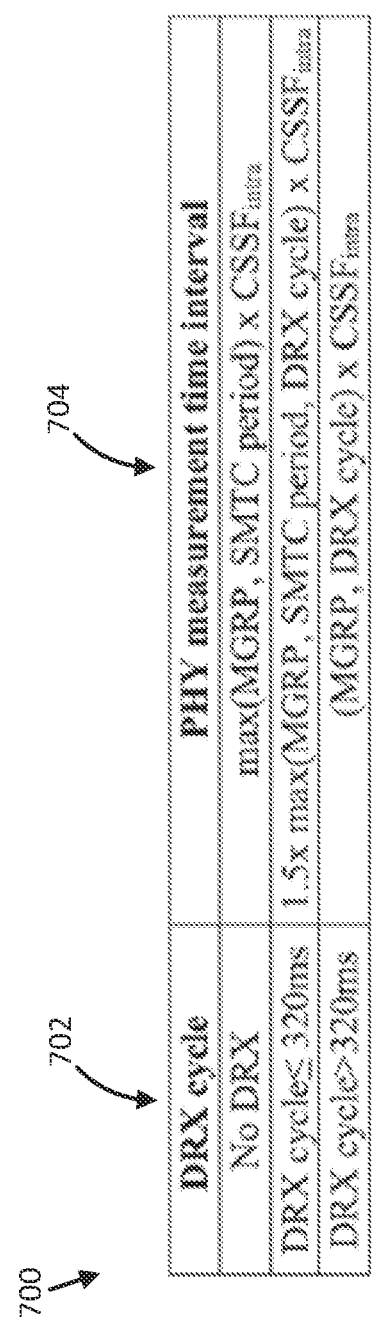
FIG. 7 illustrates a table providing example physical layer measurement time intervals based on discontinuous reception cycle for intra-frequency measurement on a reference cell with measurement gap in accordance with some embodiments.

When UE performs intra-frequency measurement on reference cell with MG, PHY measurement time interval of reference cell may be as illustrated in FIG. 7. For example, FIG. 7 illustrates a table 700 providing example PHY measurement time intervals based on DRX cycle for intra-frequency measurement on a reference cell with MG in accordance with some embodiments. The table 700 includes DRX cycles 702 and PHY measurement time intervals 704 for each DRX cycle. As can be seen the PHY measurement time interval for each DRX cycle may be defined based on an SMTC period, a cell-specific scaling factor ($CSSF_{intra}$), a length of a DRX cycle (DRX cycle), a measurement gap repetition period (MGRP), or some combination thereof.

A fourth approach may include using TRS for determining timing of a UL transmission in a UE transmission occasion. For example, if TRS is configured for reference cell, a few options may be implemented.

Figure 8:
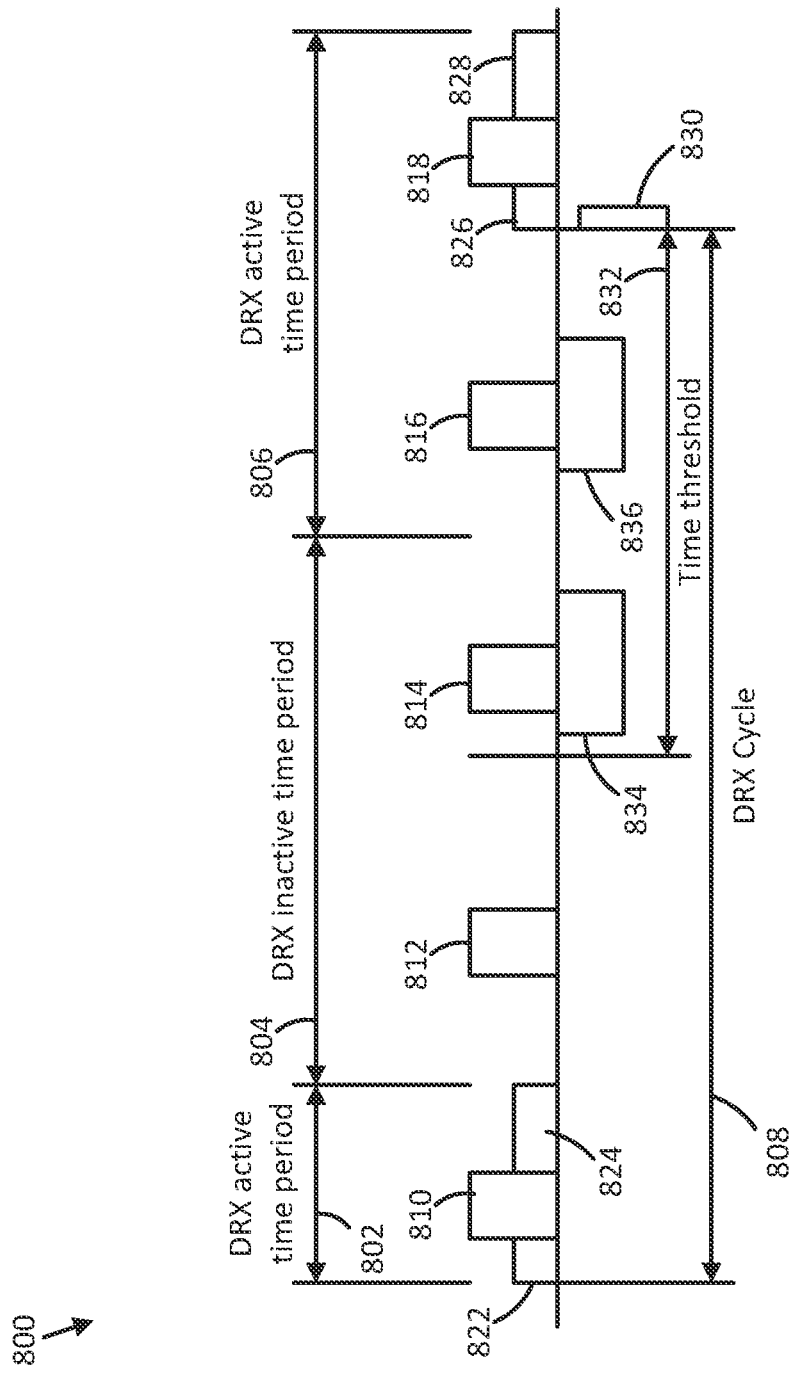
FIG. 8 illustrates an example transmission arrangement to illustrate some concepts of the fourth approach in accordance with some embodiments.

FIG. 8 illustrates an example transmission arrangement 800 to illustrate some concepts of the fourth approach in accordance with some embodiments. In particular, the transmission arrangement 800 illustrates example transmission that may occur between a gNB and a UE. The transmission arrangement 800 further illustrates possible elements that may exist based on configurations of the UE. For example, the transmission arrangement 800 includes a first DRX active time period 802, a DRX inactive time period 804, a second DRX active time period 806, and a DRX cycle 808 that may result from the UE being configured in DRX mode. Further, the transmission arrangement 800 includes a first MG 834 and a second MG 836 that may result from the UE being configured with MG. It should be understood that the UE may be not be configured in the DRX mode and/or with a MG in some of the embodiments related to the fourth approach, and the first DRX active time period 802, the DRX inactive time period 804, the second DRX active time period 806, the DRX cycle 808, the first MG 834, and/or the second MG 836 may not be implemented in some of the embodiments related to the fourth approach. These elements are illustrated in the transmission arrangement 800 as examples of where the elements may occur, although may be assumed to be omitted or not relevant in the options related to the fourth approach below when the elements are not referred to or are referred to as being omitted or not relevant.

The transmission arrangement 800 includes a first DRX active time period 802, a DRX inactive time period 804, and a second DRX active time period 806 in the illustrated embodiment. A UE may be in a DRX active state during the first DRX active time period 802 and the second DRX active time period 806, and may be in a DRX inactive state during the DRX inactive time period 804. The first DRX active time period 802 and the DRX inactive time period 804 may form a DRX cycle 808.

The transmission arrangement 800 illustrates positions for transmissions between the gNB and the UE. For example, the transmission arrangement 800 illustrates multiple candidate TRS transmission positions during which the gNB may transmit a TRS to the UE. In particular, the transmission arrangement 800 includes a first candidate TRS transmission position 810, a second candidate TRS transmission position 812, a third candidate TRS transmission position 814, a fourth candidate TRS transmission position 816, and a fifth candidate TRS transmission position 818. The candidate TRS transmission positions may be periodic in some embodiments, or may be at set times. The gNB may transmit a TRS in each of the candidate TRS transmission positions. In some instances where CCA fails, the gNB may not transmit a TRS in the candidate TRS transmission position corresponding to the CCA failure.

The transmission arrangement 800 may further include one or more transmission availability periods. For example, the transmission arrangement 800 may include a first transmission availability period 822, a second transmission availability period 824, a third transmission availability period 826, and a fourth transmission availability period 828. In embodiments where the UE is configured to operate in DRX mode, the transmission availability periods may be during the DRX active time periods. The transmission availability periods may be time periods where transmissions between the gNB and the UE may be scheduled and where other transmissions (such as the candidate TRS transmission positions) are not scheduled.

The transmission arrangement 800 may further include a UE transmission occasion 830. The UE transmission occasion 830 may be an occasion where the UE may transmit to the gNB. For example, the UE transmission occasion 830 may be utilized for a UE transmission, a UE random access channel (RACH), or other UE activities that utilize reference cell timing.

The transmission arrangement 800 may further include possible MGs. In particular, the transmission arrangement 800 may include a first MG 834 and a second MG 836 in the illustrated embodiment. The first MG 834 and the second MG 836 are included to show possible implementations and outcomes of the fourth approach for the UE configured with an MG. The first MG 834 and the second MG 836 may be a time reserved by the UE for performing particular measurements.

In a first option of the fourth approach, the reference cell on a carrier frequency subject to CCA is not available at the UE may refer to when at least one TRS is not available at the UE due to DL CCA failures at gNB during the last X ms. Otherwise the reference cell on the carrier frequency subject to CCA may be considered as available at the UE. X ms is a time threshold and UE may check the TRS availability during the last X ms before the time point on which UE is using the reference timing for certain activity. The above certain activity could be, for example, UE Tx transmission, UE RACH, or other UE activities which utilize reference cell timing. X ms could be, for example, 160 ms in some embodiments.

For example, the UE may have the UE transmission occasion 830 in the transmission arrangement 800 scheduled for UL transmission by the UE, which may be the activity as described above. The UE may track for TRS for a time threshold 832 prior to the UE transmission occasion 830 to the UE transmission occasion 830. In some embodiments, the set time period may be 160 ms.

For the first option, the UE may or may not be configured in DRX mode. In instances where the UE is not configured in DRX mode, the UE may stay in an active state and the time threshold 832 may extend within the active state, where the components of the UE may be in an on state during the active state. For example, the UE may stay in an active state for an entirety of the transmission arrangement 800, and the third candidate TRS transmission position 814 and the fourth candidate TRS transmission position 816 within the time threshold may occur while the UE is in the active state. In instances where the UE is configured in DRX mode, the time threshold 832 may extend within a DRX inactive time period (such as the DRX inactive time period 804), a DRX active time period (such as the first DRX active time period 802 and the second DRX active time period 806), or both. In instances where the time threshold 832 extends at least partially within the DRX inactive time period 804, the UE may transition from a DRX inactive state of the DRX inactive time period 804 to a DRX active state during the time threshold 832 in some embodiments. The UE may identify candidate TRS transmission positions (such as the third candidate TRS transmission position 814 and/or the fourth candidate TRS transmission position 816) that occur during the time threshold 832. The UE may further identify any TRS received from the gNB during the time threshold 832 (such as TRSs transmitted in the third candidate TRS transmission position 814 and/or the fourth candidate TRS transmission position 816).

The UE may then determine whether the TRSs during the time threshold 832 are available. In the first option, the UE may determine whether at least one TRS is not available at the UE. The UE may compare the identified candidate TRS transmission positions with the TRSs received to determine whether each candidate TRS transmission position included a TRS. The UE may determine that a TRS is not available if a candidate TRS transmission position does not include a TRS, and may determine that a TRS is available if a candidate TRS transmission position includes a TRS. The gNB may not transmit a TRS in a candidate TRS transmission position if a CCA associated with the candidate TRS transmission position fails. The UE may determine whether each of the TRSs within the time threshold 832 is available. If the UE determines that all the TRSs within the time threshold 832 are available, the UE may determine that a reference cell on a carrier frequency subject to CCA is available. The UE may measure one of the TRSs corresponding to the reference cell to determine a timing for a UL transmission of the UE during the UE transmission occasion 830. If the UE determines that at least one of the TRSs is not available during the time threshold 832, the UE may determine that the reference cell is not available for determining the timing for the UL transmission during the UE transmission occasion 830.

A second option of the fourth approach may operate regardless of a MG configuration of the UE. For example, in the second option (regardless of MG configuration), if UE is not in DRX mode, the first option of the fourth approach may be used. If UE is in DRX mode, the reference cell on a carrier frequency subject to CCA is not available at the UE may refer to when at least one TRS in DRX active time is not available at the UE due to DL CCA failures at gNB during the last X ms; otherwise the reference cell on the carrier frequency subject to CCA may be considered as available at the UE. X ms definition may be as in the first option of the fourth approach.

For example, the UE may have the UE transmission occasion 830 in the transmission arrangement 800 scheduled for UL transmission by the UE, which may be the activity as described above. The UE may track for TRS for a time threshold 832 prior to the UE transmission occasion 830 to the UE transmission occasion 830. In some embodiments, the set time period may be 160 ms.

The UE may be in DRX mode. The time threshold 832 may extend at least partially within a DRX active time period (such as the first DRX active time period 802 and the second DRX active time period 806). The UE may identify candidate TRS transmission positions (such as the third candidate TRS transmission position 814 and the fourth candidate TRS transmission position 816) that occur during the time threshold 832. The UE may further identify any TRS received from the gNB during the time threshold 832 (such as TRSs transmitted in the third candidate TRS transmission position 814 and/or the fourth candidate TRS transmission position 816).

The UE may then determine whether the TRSs during the time threshold 832 are available. In the second option of the fourth approach, the UE may determine whether at least one TRS is not available in a DRX active time. For example, as the fourth candidate TRS transmission position 816 is identified within the time threshold 832 and within the second DRX active time period 806, the UE may determine whether a TRS corresponding to the fourth candidate TRS transmission position 816 is available. The UE may determine whether a TRS was received in the fourth candidate TRS transmission position 816 to determine whether the TRS is not available in the fourth candidate TRS transmission position 816 within the second DRX active time period 806. If the UE determines that all the TRSs within the time threshold 832 are available, the UE may determine that a reference cell on a carrier frequency subject to CCA is available. The UE may measure one of the TRSs corresponding to the reference cell to determine a timing for a UL transmission of the UE during the UE transmission occasion 830. If the UE determines that at least one of the TRSs during the DRX active time period and the time threshold 832 is not available, the UE may determine that the reference cell is not available for determining the timing for the UL transmission during the UE transmission occasion 830.

A third option of the fourth approach may operate regardless of DRX configuration. For example, in the third option (regardless of DRX configuration), if no MG is configured for the UE, the first option of the fourth approach may be used. If MG is configured for the UE, the reference cell on a carrier frequency subject to CCA is not available at the UE may refer to when at least one TRS outside MG duration is not available at the UE due to DL CCA failures at gNB during the last X ms. Otherwise the reference cell on the carrier frequency subject to CCA may be considered as available at the UE. X ms definition may be as in the first option of the fourth approach. For the description of the third option of the fourth approach, the first MG 834 may be understood to be omitted from the transmission arrangement 800, and the transmission arrangement 800 may be understood to include only the second MG 836 for describing an example procedure of the third option.

For example, the UE may have the UE transmission occasion 830 in the transmission arrangement 800 scheduled for UL transmission by the UE, which may be the activity as described above. The UE may track for TRS for a time threshold 832 prior to the UE transmission occasion 830 to the UE transmission occasion 830. In some embodiments, the set time period may be 160 ms.

The UE may identify candidate TRS transmission positions (such as the third candidate TRS transmission position 814 and the fourth candidate TRS transmission position 816) that occur during the time threshold 832. The UE may further identify any TRS received from the gNB during the time threshold 832 (such as TRSs transmitted in the third candidate TRS transmission position 814 and/or the fourth candidate TRS transmission position 816).

The UE may then determine whether the TRSs during the time threshold 832 are available. In the third option of the fourth approach, the UE may determine whether at least one TRS outside of an MG and inside the time threshold 832 is not available. For example, as the third candidate TRS transmission position 814 is identified within the time threshold 832 and outside of the second MG 836, the UE may determine whether a TRS corresponding to the third candidate TRS transmission position 814 is available. The UE may determine whether a TRS was received in the third candidate TRS transmission position 814 to determine whether the TRS is not available in the third candidate TRS transmission position 814. If the UE determines that all the TRSs within the time threshold 832 and outside of the MG are available, the UE may determine that a reference cell on a carrier frequency subject to CCA is available. The UE may measure one of the TRSs corresponding to the reference cell to determine a timing for a UL transmission of the UE during the UE transmission occasion 830. If the UE determines that at least one of the TRSs outside of the MG and within the time threshold 832 is not available, the UE may determine that the reference cell is not available for determining the timing for the UL transmission during the UE transmission occasion 830.

For a fourth option of the fourth approach, if UE is not in DRX mode and no MG is configured for the UE, the first option of the fourth approach may be used. If UE is not in DRX mode but MG is configured for the UE, the third option of the fourth approach may be used. If UE is in DRX mode but no MG is configured for the UE, the second option of the fourth approach may be used. If UE is in DRX mode and MG is configured for this UE, the reference cell on a carrier frequency subject to CCA is not available at the UE may refer to when at least one TRS in DRX active time and outside MG duration are not available at the UE due to DL CCA failures at gNB during the last X ms. Otherwise the reference cell on the carrier frequency subject to CCA may be considered as available at the UE. X ms definition is as in the first option of the fourth approach. For the description of the fourth option of the fourth approach, the second MG 836 may be understood to be omitted from the transmission arrangement 800, and the transmission arrangement 800 may be understood to include only the first MG 834 for describing an example procedure of the fourth option.

For example, the UE may have the UE transmission occasion 830 in the transmission arrangement 800 scheduled for UL transmission by the UE, which may be the activity as described above. The UE may track for TRS for a time threshold 832 prior to the UE transmission occasion 830 to the UE transmission occasion 830. In some embodiments, the set time period may be 160 ms.

The UE may identify candidate TRS transmission positions (such as the third candidate TRS transmission position 814 and the fourth candidate TRS transmission position 816) that occur during the time threshold 832. The UE may further identify any TRS received from the gNB during the time threshold 832 (such as TRSs transmitted in the third candidate TRS transmission position 814 and/or the fourth candidate TRS transmission position 816).

The UE may then determine whether the TRSs during the time threshold 832 are available. In the fourth option of the fourth approach, the UE may determine whether at least one TRS outside of an MG, inside the DRX active time, and inside the time threshold 832 is not available. For example, as the fourth candidate TRS transmission position 816 is identified within the time threshold 832, outside of the first MG 834, and in the second DRX active time period 806, the UE may determine whether a TRS corresponding to the fourth candidate TRS transmission position 816 is available. The UE may determine whether a TRS was received in the fourth candidate TRS transmission position 816 to determine whether the TRS is not available in the fourth candidate TRS transmission position 816. If the UE determines that all the TRSs within the time threshold 832, outside of the MG, and inside the DRX active time period are available, the UE may determine that a reference cell on a carrier frequency subject to CCA is available. The UE may measure one of the TRSs corresponding to the reference cell to determine a timing for a UL transmission of the UE during the UE transmission occasion 830. If the UE determines that at least one of the TRSs outside of the MG, within the time threshold 832, and inside the DRX active time period is not available, the UE may determine that the reference cell is not available for determining the timing for the UL transmission during the UE transmission occasion 830.

A fifth approach may include using AP-CSI-RS for determining timing of a UL transmission in a UE transmission occasion. For example, if AP-CSI-RS is configured for reference cell, a few options may be implemented.

Figure 9:
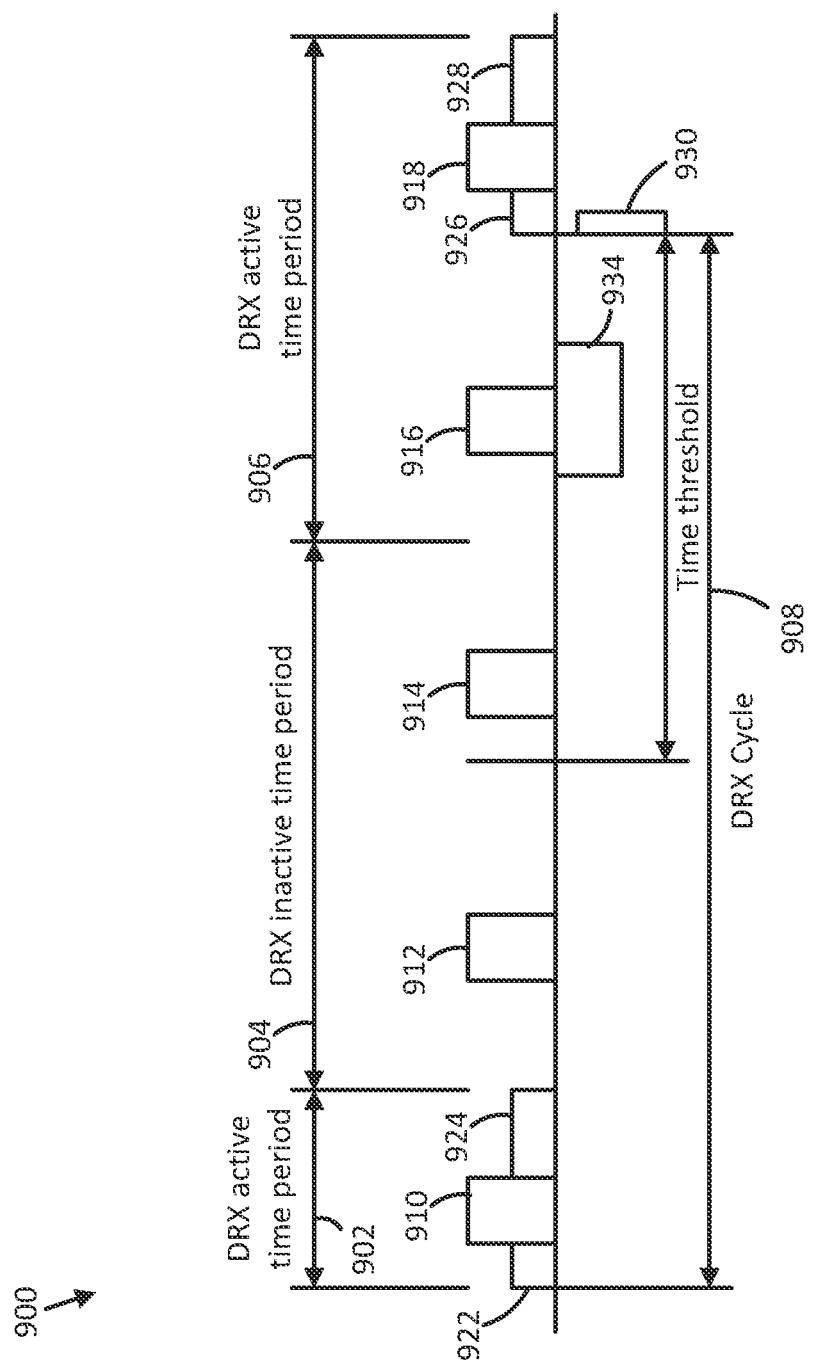
FIG. 9 illustrates an example transmission arrangement to illustrate some concepts of the fifth approach in accordance with some embodiments.

FIG. 9 illustrates an example transmission arrangement 900 to illustrate some concepts of the fifth approach in accordance with some embodiments. In particular, the transmission arrangement 900 illustrates example transmission that may occur between a gNB and a UE. The transmission arrangement 900 further illustrates possible elements that may exist based on configurations of the UE. For example, the transmission arrangement 900 includes a first DRX active time period 902, a DRX inactive time period 904, a second DRX active time period 906, and a DRX cycle 908 that may result from the UE being configured in DRX mode. Further, the transmission arrangement 900 includes a MG 934 that may result from the UE being configured with MG. It should be understood that the UE may be not be configured in the DRX mode and/or with a MG in some of the embodiments related to the fifth approach, and the first DRX active time period 902, the DRX inactive time period 904, the second DRX active time period 906, the DRX cycle 908, and/or the MG 934 may not be implemented in some of the embodiments related to the fifth approach. These elements are illustrated in the transmission arrangement 900 as examples of where the elements may occur, although may be assumed to be omitted or not relevant in the options related to the fifth approach below when the elements are not referred to or are referred to as being omitted or not relevant.

The transmission arrangement 900 includes a first DRX active time period 902, a DRX inactive time period 904, and a second DRX active time period 906 in the illustrated embodiment. A UE may be in a DRX active state during the first DRX active time period 902 and the second DRX active time period 906, and may be in a DRX inactive state during the DRX inactive time period 904. The first DRX active time period 902 and the DRX inactive time period 904 may form a DRX cycle 908.

The transmission arrangement 900 illustrates positions for transmissions between the gNB and the UE. For example, the transmission arrangement 900 illustrates multiple candidate AP-CSI-RS transmission positions during which the gNB may transmit an AP-CSI-RS to the UE. In particular, the transmission arrangement 900 includes a first candidate AP-CSI-RS transmission position 910, a second candidate AP-CSI-RS transmission position 912, a third candidate AP-CSI-RS transmission position 914, a fourth candidate AP-CSI-RS transmission position 916, and a fifth candidate AP-CSI-RS transmission position 918. The candidate AP-CSI-RS transmission positions may be periodic in some embodiments, may be aperiodic, and/or may be at set times. The gNB may transmit an AP-CSI-RS in each of the candidate AP-CSI-RS transmission positions. In some instances where CCA fails, the gNB may not transmit a AP-CSI-RS in the candidate AP-CSI-RS transmission position corresponding to the CCA failure.

The transmission arrangement 900 may further include one or more transmission availability periods. For example, the transmission arrangement 900 may include a first transmission availability period 922, a second transmission availability period 924, a third transmission availability period 926, and a fourth transmission availability period 928. In embodiments where the UE is configured to operate in DRX mode, the transmission availability periods may be during the DRX active time periods. The transmission availability periods may be time periods where transmissions between the gNB and the UE may be scheduled and where other transmissions (such as the candidate AP-CSI-RS transmission positions) are not scheduled.

The transmission arrangement 900 may further include a UE transmission occasion 930. The UE transmission occasion 930 may be an occasion where the UE may transmit to the gNB. For example, the UE transmission occasion 930 may be utilized for a UE transmission, a UE random access channel (RACH), or other UE activities that utilize reference cell timing.

The transmission arrangement 900 may further include possible MGs. In particular, the transmission arrangement 900 may include a MG 934 in the illustrated embodiment. The MG 934 is included to show possible implementations and outcomes of the fifth approach for the UE configured with an MG. The MG 934 may be a time reserved by the UE for performing particular measurements.

For the fifth approach of AP-CSI-RS, if one or more AP-CSI-RS(s) is used/configured for reference cell T/F (timing or frequency) tracking, network may indicate UE that this specific AP-CSI-RS could be used for reference cell T/F tracking for the following UE activities, for example, UE transmission, UE RACH, or other UE activities which utilize reference cell timing. The purpose of this AP-CSI-RS(s) may be also signaled to UE for information. And then with AP-CSI-RS, one of the below options may be implemented.

In a first option of the fifth approach, the reference cell on a carrier frequency subject to CCA is not available at the UE may refer to when the configured AP-CSI-RS is not available at the UE due to DL CCA failures at gNB. Otherwise the reference cell on the carrier frequency subject to CCA may be considered as available at the UE.

For example, the gNB may indicate to the UE that an AP-CSI-RS in one of the AP-CSI-RS transmission occasions is to be utilized for determining a timing for a UL transmission within the UE transmission occasion 930. In some instances, the gNB may indicate to the UE that the AP-CSI-RS is to be received in the third candidate AP-CSI-RS transmission position 914. The UE may monitor the third candidate AP-CSI-RS transmission position 914 to determine whether an AP-CSI-RS is received at the UE in the third candidate AP-CSI-RS transmission position 914. The gNB may not transmit an AP-CSI-RS in the third AP-CSI-RS transmission position 914 if a CCA associated with the third candidate AP-CSI-RS transmission position 914 fails. If the UE determines that an AP-CSI-RS is received in the third candidate AP-CSI-RS transmission position 914, the UE may determine that the reference cell on the carrier frequency subject to CCA is available. The UE may then measure the AP-CSI-RS to determine a timing for a UL transmission within the UE transmission occasion 930. For example, the UE may measure a TA of the AP-CSI-RS to determine a timing for a UL transmission within the UE transmission occasion 930. If the UE determines that an AP-CSI-RS is not received in the third candidate AP-CSI-RS transmission position 914, the UE may determine that the reference cell is not available for determining the timing for the UL transmission.

In second option of the fifth approach, if MG is not configured, the first option of the fifth approach may be used. If MG is configured, the reference cell on a carrier frequency subject to CCA is not available at the UE may refer to when the configured AP-CSI-RS outside MG duration is not available at the UE due to DL CCA failures at gNB. Otherwise the reference cell on the carrier frequency subject to CCA may be considered as available at the UE. If the AP-CSI-RS is within the MG, UE may not use that AP-CSI-RS even though it's available from network. And therefore to UE, in this case, the reference cell may still not be available.

For example, the gNB may indicate to the UE that an AP-CSI-RS in one of the AP-CSI-RS transmission occasions is to be utilized for determining a timing for a UL transmission within the UE transmission occasion 930. In some instances, the gNB may indicate to the UE that an AP-CSI-RS in the third AP-CSI-RS transmission position 914 is to be utilized for the reference cell. The UE may monitor the third candidate AP-CSI-RS transmission position 914 to determine whether an AP-CSI-RS is received at the UE in the third candidate AP-CSI-RS transmission position 914. The gNB may not transmit an AP-CSI-RS in the third AP-CSI-RS transmission position 914 if a CCA associated with the third candidate AP-CSI-RS transmission position 914 fails. If the UE determines that an AP-CSI-RS is received in the third candidate AP-CSI-RS transmission position 914, and based on the third candidate AP-CSI-RS transmission position 914 being outside of the MG 934, the UE may determine that the reference cell on the carrier frequency subject to CCA is available. The UE may then measure the AP-CSI-RS to determine a timing for a UL transmission within the UE transmission occasion 930. For example, the UE may measure a TA of the AP-CSI-RS to determine a timing for a UL transmission within the UE transmission occasion 930. If the UE determines that an AP-CSI-RS is not received in the third candidate AP-CSI-RS transmission position 914, the UE may determine that the reference cell is not available for determining the timing for the UL transmission.

In other instances, the gNB may indicate to the UE that an AP-CSI-RS in the fourth AP-CSI-RS transmission position 916 is to be utilized for the reference cell. As the fourth AP-CSI-RS transmission position 916 is within the MG 934, the UE may determine that the reference cell is not available for determining the timing for the UL transmission regardless if an AP-CSI-RS is received by the UE in the fourth AP-CSI-RS transmission position 916.

Figure 10:
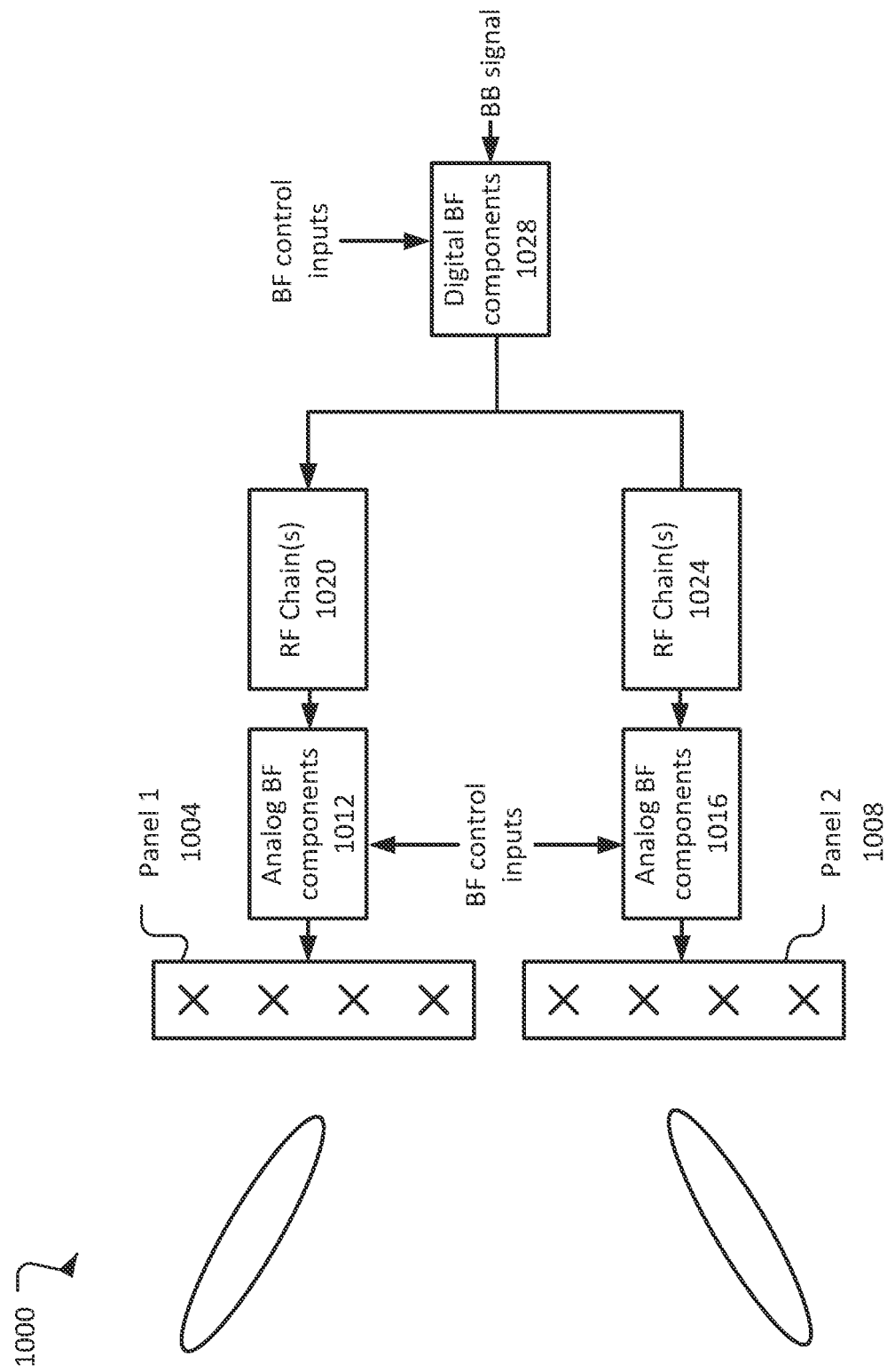
FIG. 10 illustrates example beamforming circuitry in accordance with some embodiments.

FIG. 10 illustrates example beamforming circuitry 1000 in accordance with some embodiments. The beamforming circuitry 1000 may include a first antenna panel, panel 1 1004, and a second antenna panel, panel 2 1008. Each antenna panel may include a number of antenna elements. Other embodiments may include other numbers of antenna panels.

Figure 11:
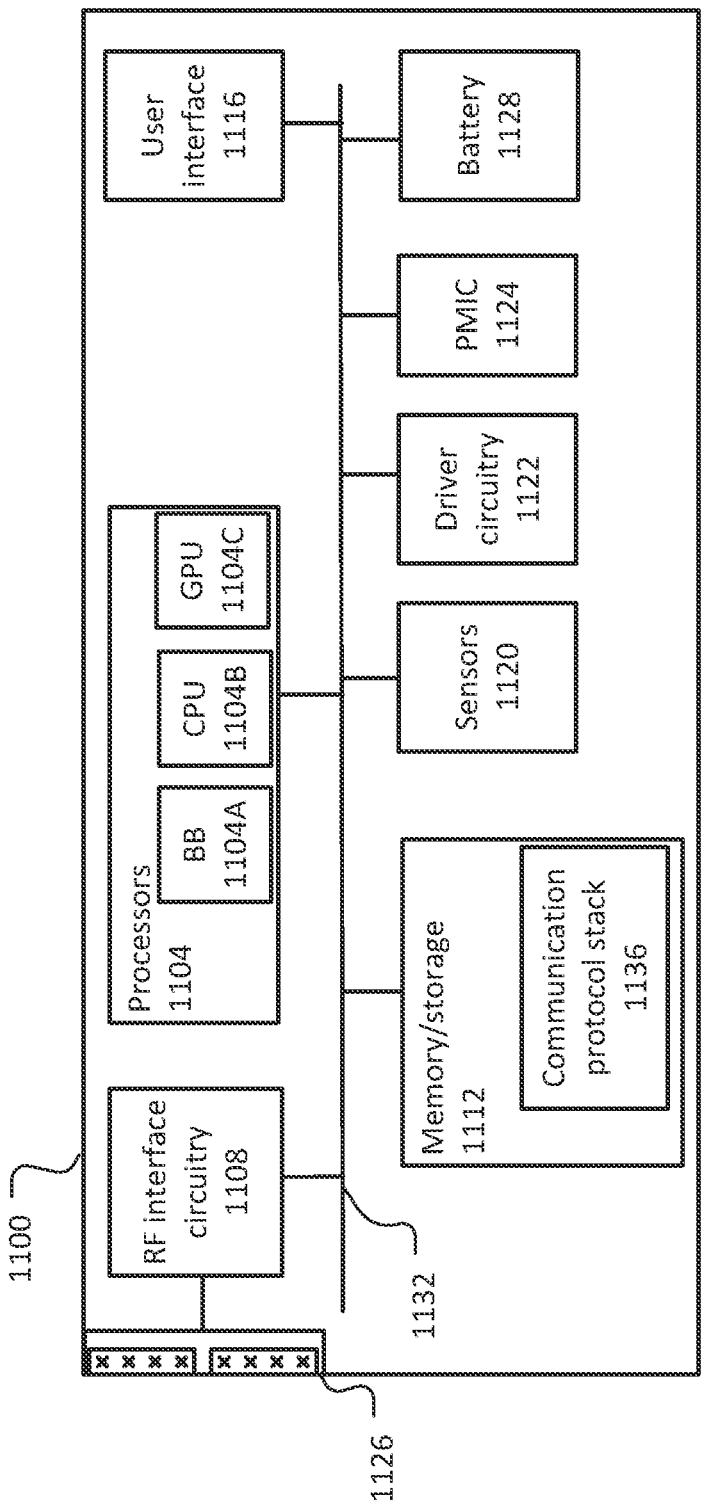
FIG. 11 illustrates an example user equipment in accordance with some embodiments.

Digital beamforming (BF) components 1028 may receive an input baseband (BB) signal from, for example, a baseband processor such as, for example, baseband processor 1104A of FIG. 11. The digital BF components 1028 may rely on complex weights to pre-code the BB signal and provide a beamformed BB signal to parallel radio frequency (RF) chains 1020/1024.

Each RF chain 1020/1024 may include a digital-to-analog converter to convert the BB signal into the analog domain: a mixer to mix the baseband signal to an RF signal: and a power amplifier to amplify the RF signal for transmission.

The RF signal may be provided to analog BF components 1012/1016, which may apply additionally beamforming by providing phase shifts in the analog domain. The RF signals may then be provided to antenna panels 1004/1008 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 11 illustrates an example UE 1100 in accordance with some embodiments. For example, the UE 1100 may be implemented as any of the UEs described throughout this disclosure. The UE 1100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1100 may be a RedCap UE or NR-Light UE.

The UE 1100 may include processors 1104, RF interface circuitry 1108, memory/storage 1112, user interface 1116, sensors 1120, driver circuitry 1122, power management integrated circuit (PMIC) 1124, antenna structure 1126, and battery 1128. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangement of the components shown may occur in other implementations.

The components of the UE 1100 may be coupled with various other components over one or more interconnects 1132, which may represent any type of interface, input/output, bus (local, system, or expansion), transmission line, trace, optical connection, etc. that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some embodiments, the baseband processor circuitry 1104A may access a communication protocol stack 1136 in the memory/storage 1112 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1112 may include one or more non-transitory, computer-readable media that includes instructions (for example, communication protocol stack 1136) that may be executed by one or more of the processors 1104 to cause the UE 1100 to perform various operations described herein. The memory/storage 1112 include any type of volatile or non-volatile memory that may be distributed throughout the UE 1100. In some embodiments, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1108 may include transceiver circuitry and radio frequency front module (RFEM) that allows the UE 1100 to communicate with other devices over a radio access network. The RF interface circuitry 1108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1126 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1126.

In various embodiments, the RF interface circuitry 1108 may be configured to transmit/receive signals in a manner compatible with NR access technologies.

The antenna 1126 may include antenna elements to convert electrical signals into radio waves to travel through the air and to convert received radio waves into electrical signals. The antenna elements may be arranged into one or more antenna panels. The antenna 1126 may have antenna panels that are omnidirectional, directional, or a combination thereof to enable beamforming and multiple input, multiple output communications. The antenna 1126 may include microstrip antennas, printed antennas fabricated on the surface of one or more printed circuit boards, patch antennas, phased array antennas, etc. The antenna 1126 may have one or more panels designed for specific frequency bands including bands in FR1 or FR2.

In some embodiments, the UE 1100 may include the beamforming circuitry 1000 (FIG. 10), where the beamforming circuitry 1000 may be utilized for communication with the UE 1100. In some embodiments, components of the UE 1100 and the beamforming circuitry may be shared. For example, the antennas 1126 of the UE may include the panel 1 1004 and the panel 2 1008 of the beamforming circuitry 1000.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers: level sensors; flow sensors: temperature sensors (for example, thermistors): pressure sensors; barometric pressure sensors; gravimeters: altimeters; image capture devices (for example, cameras or lensless apertures); light detection and ranging sensors; proximity sensors (for example, infrared radiation detector and the like); depth sensors; ambient light sensors; ultrasonic transceivers: microphones or other like audio capture devices; etc.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various input/output (I/O) devices that may be present within, or connected to, the UE 1100. For example, driver circuitry 1122 may include a display driver to control and allow access to a display device, a touchscreen driver to control and allow access to a touchscreen interface, sensor drivers to obtain sensor readings of sensor circuitry 1120 and control and allow access to sensor circuitry 1120, drivers to obtain actuator positions of electro-mechanic components or control and allow access to the electro-mechanic components, a camera driver to control and allow access to an embedded image capture device, audio drivers to control and allow access to one or more audio devices.

The PMIC 1124 may manage power provided to various components of the UE 1100. In particular, with respect to the processors 1104, the PMIC 1124 may control power-source selection, voltage scaling, battery charging, or DC-to-DC conversion.

In some embodiments, the PMIC 1124 may control, or otherwise be part of, various power saving mechanisms of the UE 1100. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1100 may power down for brief intervals of time and thus save power. If there is no data traffic activity for an extended period of time, then the UE 1100 may transition off to an RRC_Idle state, where it disconnects from the network and does not perform operations such as channel quality feedback, handover, etc. The UE 1100 goes into a very low power state and it performs paging where again it periodically wakes up to listen to the network and then powers down again. The UE 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1128 may power the UE 1100, although in some examples the UE 1100 may be mounted deployed in a fixed location, and may have a power supply coupled to an electrical grid. The battery 1128 may be a lithium ion battery, a metal-air battery, such as a zinc-air battery, an aluminum-air battery, a lithium-air battery, and the like. In some implementations, such as in vehicle-based applications, the battery 1128 may be a typical lead-acid automotive battery.

Figure 12:
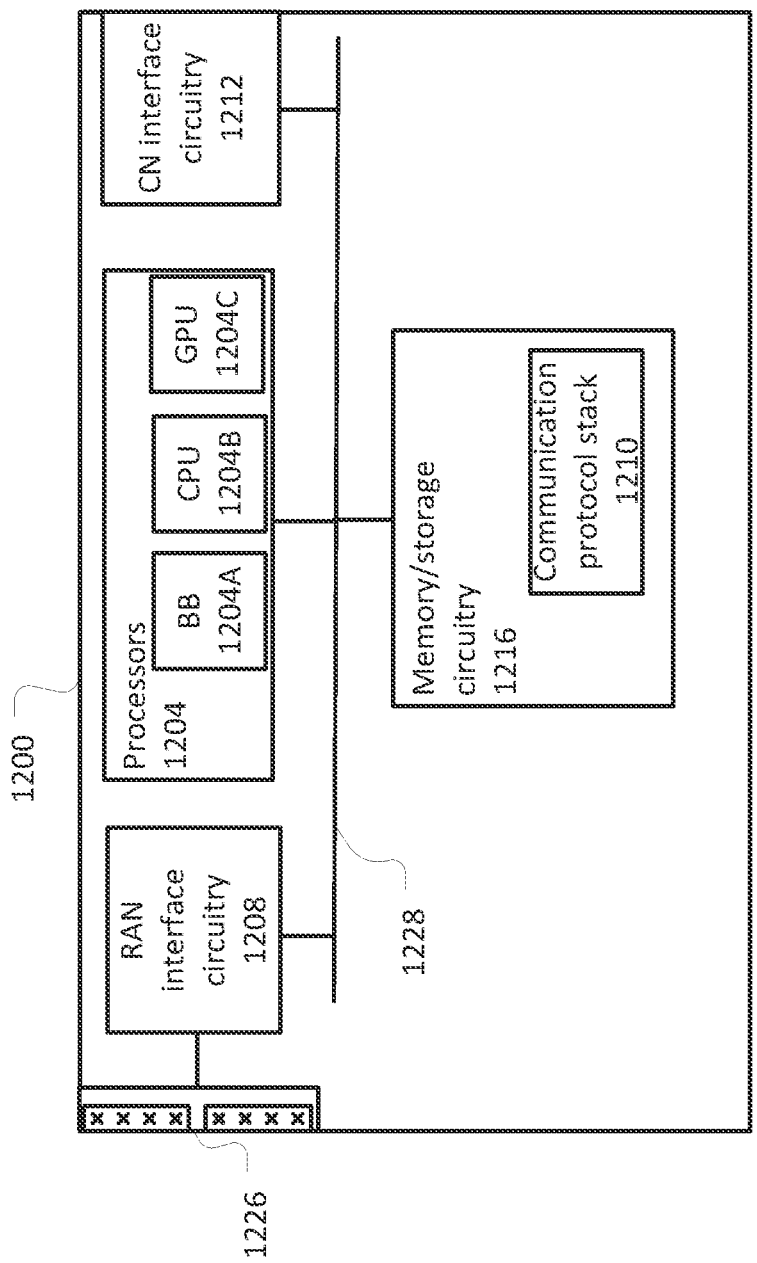
FIG. 12 illustrates an example next generation nodeB in accordance with some embodiments.

FIG. 12 illustrates an example gNB 1200 in accordance with some embodiments. For example, the gNB 1200 may be implemented as any of the gNBs described throughout this disclosure. The gNB 1200 may include processors 1204, RF interface circuitry 1208, core network (CN) interface circuitry 1212, memory/storage circuitry 1216, and antenna structure 1226.

The components of the gNB 1200 may be coupled with various other components over one or more interconnects 1228.

The processors 1204, RF interface circuitry 1208, memory/storage circuitry 1216 (including communication protocol stack 1210), antenna structure 1226, and interconnects 1228 may be similar to like-named elements shown and described with respect to FIG. 11.

The CN interface circuitry 1212 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further example embodiments are provided.

Example 1 may include one or more computer-readable media having instructions that, when executed by one or more processors, cause a user equipment (UE) to identify a UE transmission occasion during a discontinuous reception (DRX) active period of the UE, the UE being configured for DRX, determine whether a synchronization signal/physical broadcast channel block (SSB) burst is available at the UE within a time threshold within a DRX inactive period, the time threshold to begin at a set time period prior to the UE transmission occasion, and determine a timing of an uplink transmission in the UE transmission occasion based on whether the SSB burst is available at the UE.

Example 2 may include the one or more computer-readable media of example 1, wherein to determine whether the SSB burst is available at the UE includes to identify one or more candidate SSB bursts within the time threshold, and determine that all of the one or more candidate SSB bursts are available at the UE, and determine the timing includes to measure a timing advance (TA) with an SSB within the one or more candidate SSB bursts, the SSB corresponding to a reference cell.

Example 3 may include the one or more computer-readable media of example 1, wherein to determine whether the SSB burst is available at the UE includes to identify one or more candidate SSB bursts within the time threshold, and determine that at least one of the one or more candidate SSB bursts are available at the UE, and determine the timing includes to measure a timing advance (TA) with an SSB within the at least one of the one or more candidate SSB bursts, the SSB corresponding to a reference cell.

Example 4 may include the one or more computer-readable media of example 1, wherein to determine whether the SSB burst is available includes to determine whether SSBs within a first two successive candidate SSB positions for a same SSB index are available within the SSB burst are available at the UE.

Example 5 may include the one or more computer-readable media of example 1, wherein the UE is further configured with a measurement gap (MG), and wherein to determine whether the SSB burst is available at the UE is based at least in part on whether the SSB burst is within the MG.

Example 6 may include the one or more computer-readable media of example 5, wherein to determine whether the SSB burst is available includes to determine that an SSB within the SSB burst is to be utilized for a reference cell measurement to determine a timing advance (TA), determine whether the SSB burst is to be measured with the MG or without the MG, identify one or more SSB bursts either within the MG or outside of the MG based on the determination whether the SSB burst is to be measured with the MG or without the MG, the SSB burst being included in the one or more SSB bursts, and determine whether all of the one or more SSB bursts are available to the UE.

Example 7 may include the one or more computer-readable media of example 5, wherein to determine whether the SSB burst is available includes to determine that an SSB within the SSB burst is to be utilized for a reference cell measurement to determine a timing advance (TA), determine whether the SSB burst is to be measured with the MG or without the MG, identify one or more SSB bursts either within the MG or outside of the MG based on the determination whether the SSB burst is to be measured with the MG or without the MG, the SSB burst being included in the one or more SSB bursts, and determine whether at least one of the one or more SSB bursts are available to the UE.

Example 8 may include the one or more computer-readable media of example 1, wherein the UE transmission occasion is a UE transmission or a UE random access channel (RACH).

Example 9 may include a user equipment (UE) comprising memory to store an activity for a UE transmission occasion, the UE transmission occasion to occur during a discontinuous (DRX) active period of the UE, and processing circuitry coupled with the memory, the processing circuitry to identify the UE transmission occasion during the DRX active period, determine whether a synchronization signal/physical broadcast channel block (SSB) burst is available at the UE within a time threshold within a DRX inactive period, the time threshold to begin a set time period prior to a UE transmission occasion, and determine a timing of an uplink transmission in the UE transmission occasion based on whether the SSB burst is available at the UE.

Example 10 may include the UE of example 9, wherein to determine whether the SSB burst is available includes to identify one or more SSB bursts within the DRX inactive period and during the time threshold, the one or more SSB bursts including the SSB burst, and determine that at least one of the one or more SSB bursts is available, wherein the SSB burst is identified as being available based on the at least one of the one or more SSB bursts being available.

Example 11 may include the UE of example 9, wherein to determine whether the SSB burst is available includes to identify one or more SSB bursts within the DRX inactive period and during the time threshold, the one or more SSB bursts including the SSB burst, and determine that all of the one or more SSB bursts are available, wherein the SSB burst is identified as being available based on all of the one or more SSB bursts being available.

Example 12 may include the UE of example 9, wherein to determine whether the SSB burst is available includes to determine that a first two successive candidate SSB positions of a same SSB index of the SSB are available, wherein the SSB burst is identified as being available based on the first two successive candidate SSB positions being available.

Example 13 may include the UE of example 9, wherein the UE is configured with a measurement gap (MG), and wherein to determine whether the SSB burst is available includes to determine whether the SSB burst is to be measured with the MG or without the MG, identify one or more SSB bursts either within the MG or outside of the MG based on the determination whether the SSB burst is to be measured with the MG or without the MG, the one or more SSB bursts including the SSB burst, and determine that at least one of the one or more SSB bursts is available, wherein the SSB burst is identified as being available based on the at least one of the one or more SSB bursts being available.

Example 14 may include the UE of example 9, wherein the UE is configured with a measurement gap (MG), and wherein to determine whether the SSB burst is available includes to determine whether the SSB burst is to be measured with the MG or without the MG, identify one or more SSB bursts either within the MG or outside of the MG based on the determination whether the SSB burst is to be measured with the MG or without the MG, the one or more SSB bursts including the SSB burst, and determine that all of the one or more SSB bursts is available, wherein the SSB burst is identified as being available based on all of the one or more SSB bursts being available.

Example 15 may include the UE of example 9, wherein the time threshold is greater than a physical layer (PHY) measurement time interval of a reference cell.

Example 16 may include a method of operating a user equipment (UE) comprising identifying a UE transmission occasion during a discontinuous reception (DRX) active period of the UE, the UE being configure for DRX, determining whether a synchronization signal/physical broadcast channel block (SSB) burst is available at the UE within a time threshold within a DRX inactive period, the time threshold to begin at a set time period prior to the UE transmission occasion, and determining a timing of an uplink transmission in the UE transmission occasion based on whether the SSB burst is available at the UE.

Example 17 may include the method of example 16, wherein determining whether the SSB is available includes determining whether all SSB bursts within the time threshold within the DRX inactive period are available.

Example 18 may include the method of example 16, wherein determining whether the reference cell is available includes determining whether at least one SSB burst within the time threshold within the DRX inactive period is available.

Example 19 may include the method of example 16, wherein determining the timing of the uplink transmission in the UE transmission occasion includes measuring an SSB included within the SSB burst to determine a timing advance (TA) associated with a reference cell.

Example 20 may include the method of example 16, wherein determining whether the SSB burst is available includes determining whether the SSB burst is within or outside of a measurement gap (MG) of the UE, and determining whether other SSB bursts within the time threshold within the DRX inactive period correspondingly within or outside of the MG are available at the UE.

Example 21 may include a method of operating a user equipment (UE) comprising tracking a time threshold for tracking reference signal (TRS) or aperiodic channel state information reference signal (AP-CSI-RS) to be utilized for determining a timing of a UE transmission occasion, measuring the TRS or the AP-CSI-RS for a timing advance (TA) to be utilized with the UE transmission occasion, and determining the timing of the UE transmission occasion based on the TA.

Example 22 may include the method of example 21, further comprising identifying an indication that the AP-CSI-RS is to be utilized for determining the timing of the UE transmission occasion, wherein the time threshold is tracked for the AP-CSI-RS and the AP-CSI-RS is measured based on the indication.

Example 23 may include the method of example 21, wherein the time threshold is tracked for the TRS, and wherein the method further comprises identifying one or more TRSs within a discontinuous reception (DRX) active period of the UE, and determining that all of the one or more TRSs are available to the UE, wherein the TRS is measured based on all of the one or more TRSs being available to the UE.

Example 24 may include the method of example 21, wherein the time threshold is tracked for the TRS, and wherein the method further comprises identifying one or more TRSs outside of a measurement gap (MG) of the UE, and determining that all of the one or more TRSs are available to the UE, wherein the TRS is measured based on all of the one or more TRSs being available to the UE.

Example 25 may include a method of operating a user equipment (UE) comprising identifying a UE transmission occasion of the UE, determining whether a synchronization signal/physical broadcast channel block (SSB) burst is available at the UE within a time threshold, the time threshold to begin at a set time period prior to the UE transmission occasion and the time threshold being a less of a physical layer (PHY) measurement time interval of a reference cell and a preset time that is greater than 160 milliseconds (ms), and determining a timing of an uplink transmission in the UE transmission occasion based on whether the SSB is available at the UE within the time threshold.

Example 26 may include the method of example 25, further comprising determining whether the SSB is available at the UE based on whether a first two successive candidate SSB positions for a same SSB index within the SSB burst are not available at the UE.

Example 27 may include an apparatus comprising means to perform one or more elements of a method described in or related to any of examples 1-26, or any other method or process described herein.

Example 28 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 29 may include an apparatus comprising logic, modules, or circuitry to perform one or more elements of a method described in or related to any of examples 1-26, or any other method or process described herein.

Example 30 may include a method, technique, or process as described in or related to any of examples 1-26, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of examples 1-26, or portions thereof.

Example 32 may include a signal as described in or related to any of examples 1-26, or portions or parts thereof.

Example 33 may include a datagram, information element, packet, frame, segment, PDU, or message as described in or related to any of examples 1-26, or portions or parts thereof, or otherwise described in the present disclosure.

Example 34 may include a signal encoded with data as described in or related to any of examples 1-26, or portions or parts thereof, or otherwise described in the present disclosure.

Example 35 may include a signal encoded with a datagram, IE, packet, frame, segment, PDU, or message as described in or related to any of examples 1-26, or portions or parts thereof, or otherwise described in the present disclosure.

Example 36 may include an electromagnetic signal carrying computer-readable instructions, wherein execution of the computer-readable instructions by one or more processors is to cause the one or more processors to perform the method, techniques, or process as described in or related to any of examples 1-26, or portions thereof.

Example 37 may include a computer program comprising instructions, wherein execution of the program by a processing element is to cause the processing element to carry out the method, techniques, or process as described in or related to any of examples 1-26, or portions thereof.

Example 38 may include a signal in a wireless network as shown and described herein.

Example 39 may include a method of communicating in a wireless network as shown and described herein.

Example 40 may include a system for providing wireless communication as shown and described herein.

Example 41 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail. numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
   determine whether two successive candidate synchronization signal/physical broadcast channel block (SSB) positions for a same SSB index within a discovery burst transmission window during a last 1280 milliseconds prior to an uplink (UL) transmission are available;
   determine whether a reference cell on a carrier frequency subject to clear channel assessment (CCA) is available based at least in part on whether the two successive candidate SSB positions are determined to be available; and
   determine a timing of the UL transmission based at least in part on whether the reference cell is determined to be available.

2. The one or more non-transitory computer-readable media of claim 1, wherein to:
   determine the timing includes to measure a timing advance (TA) with an SSB within the discovery burst transmission window, the SSB corresponding to the reference cell.

3. The one or more non-transitory computer-readable media of claim 1, wherein to:
   determine whether the reference cell is available includes to:
      identify one or more discovery burst transmission windows within the last 1280 milliseconds; and
      determine that at least one of the one or more discovery burst transmission windows are available; and
   determine the timing includes to measure a timing advance (TA) with an SSB within the at least one of the one or more discovery burst transmission windows, the SSB corresponding to the reference cell.

4. The one or more non-transitory computer-readable media of claim 1, wherein a user equipment (UE) is configured with a measurement gap (MG), and wherein to determine whether the reference cell is available at the UE is based at least in part on whether the discovery burst transmission window is within the MG.

5. The one or more non-transitory computer-readable media of claim 4, wherein to determine whether the reference cell is available includes to:
   determine that an SSB within the discovery burst transmission window is to be utilized for a reference cell measurement to determine a timing advance (TA);

determine whether the discovery burst transmission window is to be measured with the MG or without the MG;
identify one or more discovery burst transmission windows either within the MG or outside of the MG based on the determination whether the discovery burst transmission window is to be measured with the MG or without the MG, the discovery burst transmission window being included in the one or more discovery burst transmission windows; and
determine whether all of the one or more discovery burst transmission windows are available.

6. The one or more non-transitory computer-readable media of claim 4, wherein to determine whether the reference cell is available includes to:
determine that an SSB within the discovery burst transmission window is to be utilized for a reference cell measurement to determine a timing advance (TA);
determine whether the discovery burst transmission window is to be measured with the MG or without the MG;
identify one or more discovery burst transmission window either within the MG or outside of the MG based on the determination whether the discovery burst transmission window is to be measured with the MG or without the MG, the discovery burst transmission window being included in the one or more discovery burst transmission windows; and
determine whether at least one of the one or more SSB bursts are available to the UE.

7. The one or more non-transitory computer-readable media of claim 1, wherein the UL transmission occasion is a UE transmission or a UE random access channel (RACH) transmission.

8. An apparatus comprising:
processing circuitry to:
determine whether two successive candidate synchronization signal/physical broadcast channel block (SSB) positions for a same SSB index within a discovery burst transmission window during a last 1280 milliseconds prior to an uplink (UL) transmission are available;
determine whether a reference cell on a carrier frequency subject to clear channel assessment (CCA) is available based at least in part on whether the two successive candidate SSB positions are determined to be available; and
determine a timing of the UL transmission based at least in part on whether the reference cell is determined to be available; and
interface circuitry coupled with the processing circuitry, the interface circuitry to communicatively couple the processing circuitry with a component of a device.

9. The apparatus of claim 8, wherein to determine whether the reference cell is available includes to:
identify one or more discovery burst transmission windows within a discontinuous (DRX) inactive period and during the last 1280 milliseconds, the one or more discovery burst transmission windows including the discovery burst transmission window; and
determine that at least one of the one or more discovery burst transmission windows is available, wherein the reference cell is identified as being available based on the at least one of the one or more discovery burst transmission windows being available.

10. The apparatus of claim 8, wherein to determine whether the reference cell is available includes to:
identify one or more discovery burst transmission windows within a discontinuous (DRX) inactive period and during the last 1280 milliseconds, the one or more discovery burst transmission windows including the discovery burst transmission window; and
determine that all of the one or more discovery burst transmission windows are available, wherein the reference cell is identified as being available based on all of the one or more discovery burst transmission windows being available.

11. The apparatus of claim 8, wherein the reference cell is identified as being available based on the two successive candidate SSB positions being available.

12. The apparatus of claim 8, wherein a user equipment (UE) is configured with a measurement gap (MG), and wherein to determine whether the reference cell is available includes to:
determine whether the discovery burst transmission window is to be measured with the MG or without the MG;
identify one or more discovery burst transmission windows either within the MG or outside of the MG based on the determination whether the discovery burst transmission window is to be measured with the MG or without the MG, the one or more bursts discovery burst transmission windows including the SSB burst discovery burst transmission window; and
determine that at least one of the one or more discovery burst transmission windows is available, wherein the reference cell is identified as being available based on the at least one of the one or more discovery burst transmission windows being available.

13. The apparatus of claim 8, wherein a user equipment (UE) is configured with a measurement gap (MG), and wherein to determine whether the reference cell is available includes to:
determine whether the discovery burst transmission window is to be measured with the MG or without the MG;
identify one or more discovery burst transmission windows either within the MG or outside of the MG based on the determination whether the discovery burst transmission window is to be measured with the MG or without the MG, the one or more discovery burst transmission windows including the discovery burst transmission window; and
determine that all of the one or more discovery burst transmission windows are available, wherein the reference cell is identified as being available based on all of the one or more discovery burst transmission windows being available.

14. A method comprising:
determine whether two successive candidate synchronization signal/physical broadcast channel block (SSB) positions for a same SSB index within a discovery burst transmission window during a last 1280 milliseconds prior to an uplink (UL) transmission are available;
determining whether a-synchronization signal/physical broadcast channel block (SSB) reference cell on a carrier frequency subject to clear channel assessment (CCA) is available based at least in part on whether the two successive candidate SSB positions are determined to be available; and
determining a timing of the UL transmission based at least in part on whether the reference cell is determined to be available.

15. The method of claim 14, wherein determining whether the reference cell is available includes determining whether all discovery burst transmission windows within the last 1280 milliseconds within a discontinuous (DRX) inactive period are available.

16. The method of claim 14, wherein determining whether the reference cell is available includes determining whether at least one discovery burst transmission window within the last 1280 milliseconds within a discontinuous (DRX) inactive period is available.

17. The method of claim 14, wherein determining the timing of the UL transmission in a UE transmission occasion includes measuring an SSB included within the discovery burst transmission window to determine a timing advance (TA) associated with the reference cell.

18. The method of claim 14, wherein determining whether the reference cell is available includes:
- determining whether the discovery burst transmission window is within or outside of a measurement gap (MG) of a user equipment (UE); and
- determining whether other-SSB bursts discovery burst transmission windows within the last 1280 milliseconds within a discontinuous (DRX) inactive period correspondingly within or outside of the MG are available.

\* \* \* \* \*

UNITED STATES PATENT AND TRADEMARK OFFICE
CERTIFICATE OF CORRECTION

PATENT NO. : 12,213,091 B2
APPLICATION NO. : 17/442080
DATED : January 28, 2025
INVENTOR(S) : Jie Cui et al.

Page 1 of 1

It is certified that error appears in the above-identified patent and that said Letters Patent is hereby corrected as shown below:

In the Claims

In Column 39, Line 30: In Claim 7 please delete "occasion".

In Column 39, Line 31: In Claim 7 please delete "UE transmission or a".

In Column 40, Line 22: In Claim 12 please delete "bursts".

In Column 40, Line 23: In Claim 12 please delete "SSB burst".

In Column 40, Line 54-55: In Claim 14 please delete "a-synchronization signal/physical broadcast channel block (SSB)" and insert --a--.

In Column 41, Line 16: In Claim 18 please delete "-SSB bursts".

Signed and Sealed this
Eleventh Day of March, 2025

Coke Morgan Stewart
*Acting Director of the United States Patent and Trademark Office*